US007571387B1

(12) United States Patent (10) Patent No.: US 7,571,387 B1
Yehuda et al. (45) Date of Patent: Aug. 4, 2009

(54) METHODS AND APPARATUS FACILITATING MANAGEMENT OF A SAN

(75) Inventors: Hanna Yehuda, Newton, MA (US);
Alan R. Schell, Hopkinton, MA (US);
Michaell A. Galvin, Foxboro, MA (US)

(73) Assignee: EMC Corporation, Hopkinton, MA (US)

( * ) Notice: Subject to any disclaimer, the term of this patent is extended or adjusted under 35 U.S.C. 154(b) by 520 days.

(21) Appl. No.: 11/231,705

(22) Filed: Sep. 21, 2005

(51) Int. Cl.
*G06F 15/173* (2006.01)
*G06F 15/177* (2006.01)
*G06F 3/048* (2006.01)

(52) U.S. Cl. .................. 715/734; 715/737; 715/811; 715/825; 709/223

(58) Field of Classification Search .................. 715/734, 715/736, 811, 825, 737, 845; 709/223
See application file for complete search history.

(56) References Cited

U.S. PATENT DOCUMENTS

| | | | | |
|---|---|---|---|---|
| 5,664,133 A * | 9/1997 | Malamud et al. | ............ | 715/816 |
| 7,003,567 B2 * | 2/2006 | Suzuki et al. | ................ | 709/224 |
| 7,206,790 B2 * | 4/2007 | Kodama | ...................... | 707/102 |
| 7,287,063 B2 * | 10/2007 | Baldwin et al. | ............. | 709/216 |
| 7,310,774 B1 * | 12/2007 | Arquie et al. | ................ | 715/734 |
| 2004/0085367 A1 * | 5/2004 | Hagarty, Jr. | .................. | 345/854 |
| 2004/0172466 A1 * | 9/2004 | Douglas et al. | ............. | 709/224 |
| 2006/0059428 A1 * | 3/2006 | Humphries et al. | ......... | 715/734 |

* cited by examiner

*Primary Examiner*—Kieu D Vu
*Assistant Examiner*—Blaine T. Basom
(74) *Attorney, Agent, or Firm*—Chapin IP Law, LLC; Barry W. Chapin, Esq.

(57) ABSTRACT

A resource manager (e.g., a computer, a software application, etc.) initiates display of a list of managed objects associated with respective resources in a storage area network. The resource manager then receives a command from a user viewing the list to display view mode options associated with a set of two or more selected managed objects in the list. In response to receiving the command, the resource manager initiates display of a menu of view mode options that can be applied to each of the two or more managed objects in the set. The menu provided by the resource manager excludes any view mode options that pertain only to one of the managed objects or fewer than all managed objects in the set. Common view modes that can be applied to all managed objects in the set appear in the menu for selection by the user.

15 Claims, 17 Drawing Sheets

METHODS AND APPARATUS FACILITATING MANAGEMENT OF A SAN

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Data storage system developers have responded to the increased need for storage by integrating high capacity data storage systems, data communications devices (e.g., switches), and computer systems (e.g., host computers or servers) into networks called "storage networks" or "Storage Area Networks" (SANs).

In general, a storage area network is a collection of data storage systems that are networked via a switching fabric to a number of host computer systems operating as servers. The host computers access data stored in the data storage systems on behalf of client computers that request data from the data storage systems. For example, according to conventional applications, upon receiving a storage access request, a respective host computer accesses a large repository of storage through the switching fabric on behalf of the requesting client. Thus, a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, conventional network management storage applications generate a graphical user interface utilized by a network manager to graphically select, interact with, and manage local or remote devices and associated software processes associated with the storage area network.

Based on use of the graphical user interface in combination with an input device such as a hand operated mouse and corresponding pointer displayed on a viewing screen, a network manager can "click" on managed object icons to manage respective hardware and software entities such as file systems, databases, storage devices, peripherals, network data communications devices, etc., associated with the storage area network. In some storage area networks, a network management station and associated management software allows a network administrator or systems manager (a person responsible for managing the storage network) to allocate and de-allocate resources (e.g., hardware and software resources) in a storage area network. Consequently, the network manager can reconfigure a SAN according to users' present needs.

The infrastructure required to support access to data in a storage area network can be quite complex. As an example, consider the number of hardware and software components that must work in harmony in order for a user's software application executing on a host computer system to successfully access data stored in a storage array of a SAN. To access such data, the user application provides file system calls or requests (e.g., open, read, write and so forth) to a file system resource presented to the user application by an operating system executing on the host computer system. The file system receives the file system calls and operates to map such file system calls to a series of I/O requests.

The operating system on the host computer system then transmits the I/O requests through a host interface device resource, such as an interface card ((e.g., SCSI or FibreChannel adapter) having one or more I/O port resources, across an interface cable or networking medium (e.g., in a storage area network implementation) to a front-end adapter interface card resource operating within a high-capacity data storage array of the SAN. The front-end adapter interface card receives the I/O requests and interprets them to identify appropriate data locations within specific storage device resources contained in the storage array.

After the requested data is accessed via the storage devices, respective I/O responses are returned to the user application along an information or data flow path based on operations and processing functionality provided by each of the aforementioned components and resources in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

SUMMARY

Management of a storage area network can be a challenge due to the complex network of resources that must be configured so that the storage area network operates properly for a multitude of different types of users. For example, as discussed, resources in a storage area network typically include a multitude of storage area network resources (such as respective resources in a path between a host resource and storage array) working in harmony so that a host resource (e.g., server) of the storage area network can access data from the storage arrays on behalf of requesting clients. In certain cases, when even a single resource in the storage area network is not properly configured in a chain of respective resources, a client in communication with a host resource of the storage area network may not be able to access data in the storage area network.

Network managers that manage a storage area network and corresponding resources can range from inexperienced users who have a rudimentary understanding of how to configure a storage area network to experienced users who perform such tasks on a daily basis. Thus, network manager software applications for managing the storage area network preferably cater to a wide range of network managers having different levels of experience. Whether a respective network manager has an abundance or a limited amount of experience, however, either type of respective user typically prefers to have at their disposal advanced viewing capabilities to quickly learn current configuration settings of a corresponding storage area network.

The following disclosure includes several useful embodiments for enabling a user to view resources (e.g., via different view mode options) associated with a respective storage area network. In general, techniques herein enable a user to select multiple resources and, thereafter, apply a common view mode option for simultaneously viewing multiple selected resources associated with the storage area network in the same view mode.

For example, according to one embodiment herein, a resource manager (e.g., a computer, a software application, etc.) initiates display of a list of managed objects associated with respective resources in a storage area network. The list of managed objects can appear on a display screen for viewing by a respective user in response to a user selecting one or more resource from a hierarchical tree of resources associated with the storage area network. The resource manager receives a command from the user viewing the display screen to display view mode options associated with a set of at two or more selected managed objects in the list. In response to receiving the command, the resource manager initiates display of a menu of view mode options that can be applied to each of the two or more managed objects in the set. In other words, the menu provided by the resource manager excludes any view mode options associated with the two or more managed objects that cannot be applied to all managed objects in the set of selected managed objects. Based on the above technique, a user can select one or more resources in a hierarchical tree and thereafter view different configurations and resources of a respective storage area network without having to go back and make further selections from the hierarchical tree to view related resources.

As a further example of embodiments herein, assume that the resource manager identifies that a first managed object of a selected set of two managed objects can be viewed according to a first view mode and a second view mode. Additionally, assume that the resource manager identifies that a second managed object of the selected set of two managed objects can be viewed according to the second view mode as well as a third view mode. In this example, in response to the user command to display a menu of view mode options common to all of the selected managed objects in the set (e.g., the first managed object and the second managed object), the resource manager displays a menu of view mode options including only the second view mode as a selectable option for viewing the selected managed objects in the set because the first view mode pertains only to the first managed object and the third view mode pertains only to the second managed object. The second view mode pertains to both the first managed object and the second managed object and therefore can be selected as a view mode for viewing both the first managed object and the second managed object.

In addition to the above embodiments, another embodiment herein includes a resource manager that displays a hierarchical tree of resources associated with a storage area network in a first region of a display screen. The hierarchical tree displayed in the first region of the display screen includes an indication (e.g., via highlighting) of a set of one or more resources that has been initially selected for viewing in a second region of the display screen. The resource manager displays a visual representation (e.g., a topology layout) including at least a portion of the set of one or more resources (e.g., the resources highlighted in the hierarchical tree) in the second region of the display screen as well as a visual representation of a set of other resources (e.g., non-selected resources) related to the set of at least one resource in the second region of the display screen. Thereafter, the resource manager receives a selection (e.g., from a respective user viewing the display screen) of a respective resource from the set of other resources displayed in the second display region. In response to receiving the selection, the resource manager updates the hierarchical tree to include an indication of a location in the hierarchical tree of the respective resource associated with the new selection. In other words, based on a selection in the second display region of a resource other than the initially selected resource from the hierarchical tree in the first display region, the resource manager updates the hierarchical tree to reflect the new selection in the second display region. In addition, available "view" buttons at a respective top right portion of a display screen will change depending on appropriate views associated with the newly selected resource. For example, the resource manager discontinues highlighting the initial selection in the tree and then highlights a location in the hierarchical tree corresponding to the newly selected resource as well as changes a listing of available view mode options associated with the new selection. Consequently, a user viewing the display screen can select different resources (e.g., resources related to but not actually included an initial selection) for viewing without having to always go back and make a respective selection from the hierarchical tree.

Note that in a further embodiment, in addition to updating the hierarchical tree to highlight selected resources, the resource manager enables a user to select how to display information associated with each new selection of a related resource when the user makes a selection. For example, upon selection of a related resource for viewing, the resource manager presents a list of possible view modes for viewing the newly selected resource. Accordingly, as discussed above, a user can select a "related" resource for viewing as well as one of multiple view modes for viewing the newly selected resource.

Techniques herein are well suited for use in applications such as management of storage area networks and specific applications as discussed herein. However, it should be noted that configurations herein are not limited to use in such applications and thus configurations herein and deviations thereof are well suited for other applications as well.

Other examples of the present application include a computerized device (e.g., a host computer, workstation, etc.) configured to support the aforementioned method operations disclosed herein as embodiments of the present disclosure to facilitate viewing of configuration settings associated with a storage area network. In such embodiments, the computerized device such as a management control center includes a memory system, a processor (e.g., a processing device), a display, and an interconnect. The interconnect supports communications among the display, the processor, and the memory system. The memory system is encoded with an application that, when executed on the processor, produces a process that enables the user to view resources and configure a storage area network.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to facilitate execution of a management function (e.g., view mode management) as explained herein. The computer program logic, when executed on at least one processor with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to perform the steps of: i) displaying a list of managed objects associated with respective resources in a storage area network; ii) receiving a command to display view mode options associated with a set of at least two managed objects in the list; and iii) in response to receiving the command, displaying a menu of view mode options, that can be applied to each of the at least two managed objects in the set, the menu excluding any view mode options associated with the at least two managed objects that cannot be applied to all managed objects in the set. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

According to one embodiment herein, a resource manager (e.g., a computer, a software application, etc.) initiates display of a list of managed objects associated with respective resources in a storage area network. A user viewing the list of managed objects selects a set of the managed objects and generates a command to view a menu of selectable view mode options associated with the selected set of managed objects. In response to receiving the command, the resource manager initiates display of a menu of view mode options that can be applied to each of the two or more managed objects in the set. That is, the menu provided by the resource manager excludes any view mode options that pertain only to one of the managed objects or fewer than all managed objects in the set. The menu, however, includes common view mode options that can be applied to all managed objects in the set for selection by the user. Consequently, the user such as a network manager can display storage area network resources according to different view mode options in the menu and more easily learn of a configuration of a storage area network.

Figure 1:
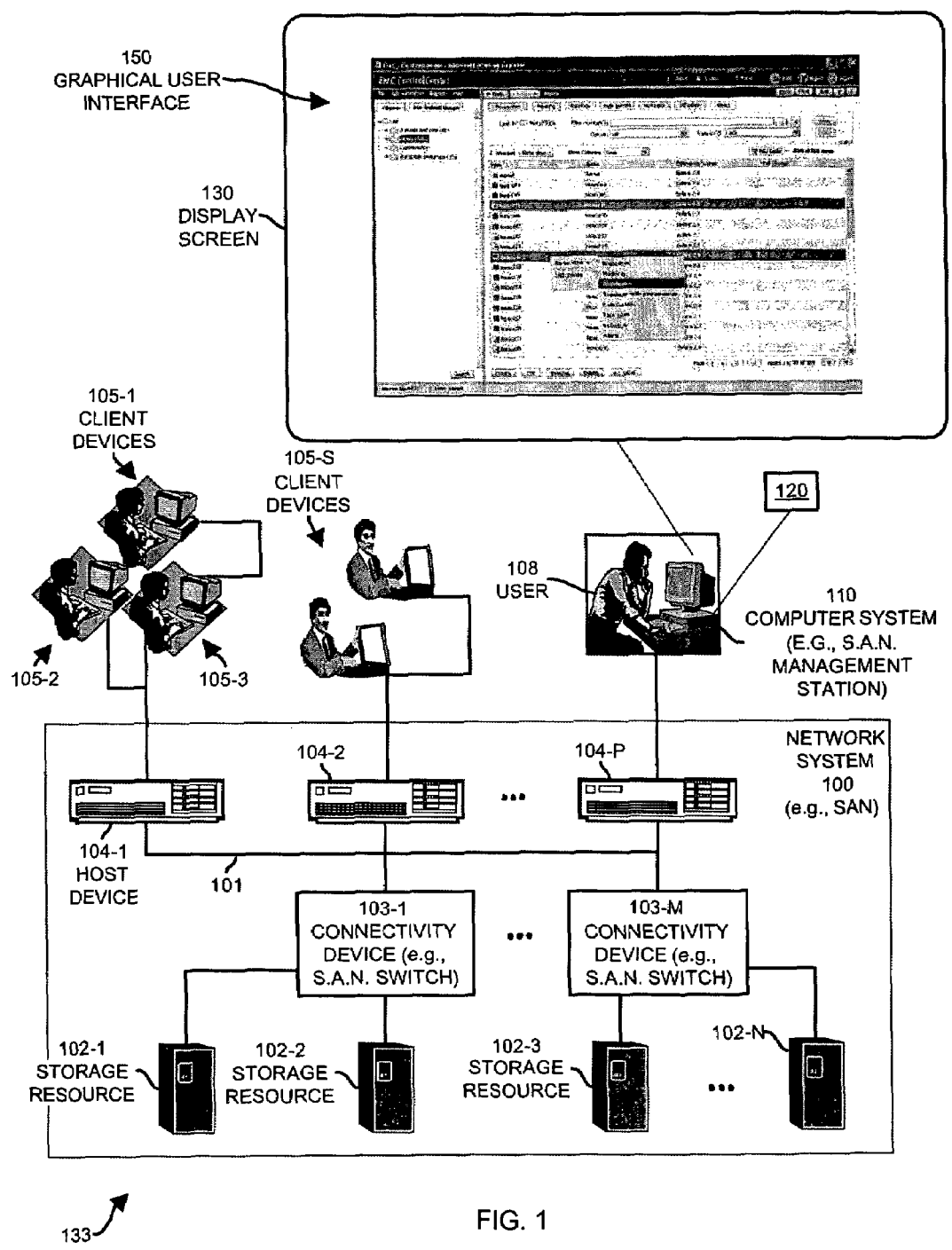
FIG. 1 is a pictorial/block diagram of a storage area network and corresponding management station configured to operate according to an embodiment herein.

FIG. 1 illustrates a storage area network environment 133 suitable for explaining an operation of example embodiments herein. As shown, network system 100 (e.g., potentially including multiple types of networks) includes a network medium 101 such as a high-speed data communications medium (e.g., Ethernet, optical network, or other type of network) that interconnects a plurality of components such as storage resources 102-1, 102-2, . . . , 102-N (collectively, storage resources 102), network switches 103-1, . . . , 103-M (collectively, network switches 103 such as SAN switches), host devices 104-1 (e.g., host servers), 104-2, . . . , 104-P (collectively, host devices 104), client devices 105-1, 105-2, . . . , 105-S (collectively, client devices 105), and computer system 110 (e.g., a storage area network management station). Computer system 110 includes resource manager 120 such as a software application that supports generation of graphical user interface 150 on display 130.

In the example shown, computer system 110 is configured as a storage area network management station operated by network manager or user 108 (e.g., a user responsible for managing resources associated with storage area network environment 133). Computer system 110 executes a resource manager application 120 (e.g., a software graphical user interface application more particularly shown in FIG. 2 and as discussed throughout this application) that generates and displays information (e.g., graphical user interface 150) in accordance with embodiments explained herein.

The resource manager 120 in this example context may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display screen 130 (e.g., a computer monitor or other visual display device) that resource manager 120 controls to display a graphical user interface 150 as explained herein. In general, computer system 110 receives input from user 108 or other source what to display on display screen 130. For example, user 108 provides input commands to control what information (e.g., tables, pop-up screens, pull-down menus, view modes, etc.) is displayed on display 130. Typically, a user 108 makes a selection of one of multiple view mode options for viewing resources associated with storage area network environment 133. In response to the selection, computer system 110 generates the graphical user interface 150 according to the selected view mode to enable the user 108 to view configuration details associated with the storage area network environment 133.

Figure 2:
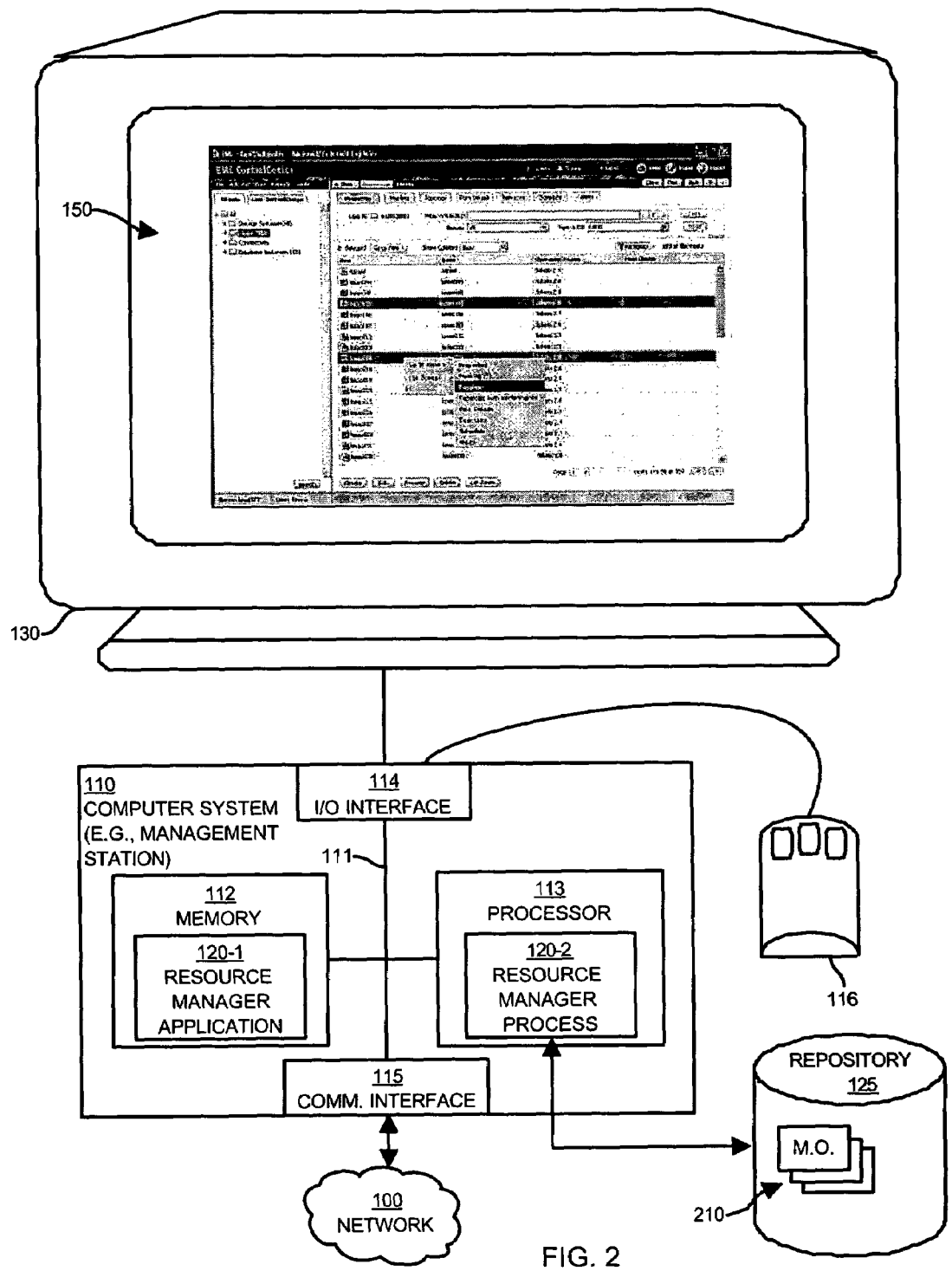
FIG. 2 is a block diagram of a sample architecture of a computer system management station for executing a resource manager application to view network configuration settings according to an embodiment herein.

FIG. 2 is a block diagram illustrating an example architecture of computer system 110 (e.g., a storage area network management station). Computer system 110 may be a digital processing device such as a personal computer, workstation, portable computing device, console, laptop, network terminal, etc.

As shown, computer system 110 of the present example includes an interconnect 111 that couples a memory system 112, a processor 113, an input/output interface 114, and a communications interface 115. Peripheral device 116 (e.g., one or more viewer controlled devices such as a keyboard, mouse, etc.) couples to processor 113 through I/O interface 114 and enables user 108 to provide input commands and thus generally control display management functions associated with graphical user interface 150. Repository 125 stores managed objects 210 associated with managed entities (e.g., hardware and software resource entities associated with host devices 104, storage resources 102, etc.) in network system 100. Communications interface 115 enables computer system 110 (and corresponding user 108) to communicate with other devices (i.e., resources) over network 100.

As shown, memory system 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that support processing functionality according to different embodiments described herein. During operation, processor 113 accesses memory system 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110. As discussed, one purpose of the resource manager 120 is to display a list of view mode options associated with a selected set of managed objects (e.g., resources) in the storage area network environment 133.

It should be noted that the resource manager 120 executed in computer system 110 is represented in FIG. 2 by either one or both of the resource manager application 120-1 and/or the resource manager process 120-2. For purposes of this discussion, general reference will be made to the resource manager 120 as performing or supporting the various steps and functional operations to carry out techniques discussed herein.

It should also be noted that example configurations herein include the resource manager application 120-1 itself (i.e., the un-executed or non-performing logic instructions and/or data). The resource manager application 120-1 may be stored on a computer readable medium (such as a floppy disk), hard disk, or optical medium. The resource manager application 120-1 may also be stored in a memory system 112 such as in firmware, read only memory (ROM), or, as in this example, as executable code in, for example, Random Access Memory (RAM). In addition to these embodiments, it should also be noted that other embodiments herein include the execution of resource manager application 120-1 in processor 113 as the resource manager process 120-2. Thus, those skilled in the art will understand that the computer system 110 may include other processes and/or software and hardware components, such as an operating system that facilitates carrying out management functions associated with the storage area network.

To display certain information (e.g., icons representing resources in a storage area network) in graphical user interface 150, the host computer system 110 (e.g., the resource manager process 120-2) extracts information from repository 125 such as a database. For example, in one embodiment, the resource manager 120 receives an identity of two or more managed objects (e.g., resources) associated with the storage area network 100. The resource manager 120 identifies view modes associated with the selected managed objects and displays a menu of view mode options that can be applied to the selected managed objects.

In one embodiment, computer system 110 extracts information from repository 125 using SQL (Structured Query Language) and stores the information in data structures for processing. For example, repository 125 contains managed objects 210 (e.g., database records, tables, data structures, etc.) associated with various hardware and software resources associated with network system 100 or storage area network environment 133 in general. More details regarding use of managed objects 210 corresponding to resources in storage area network environment 133 will be discussed in connection with FIG. 3.

Figure 3:
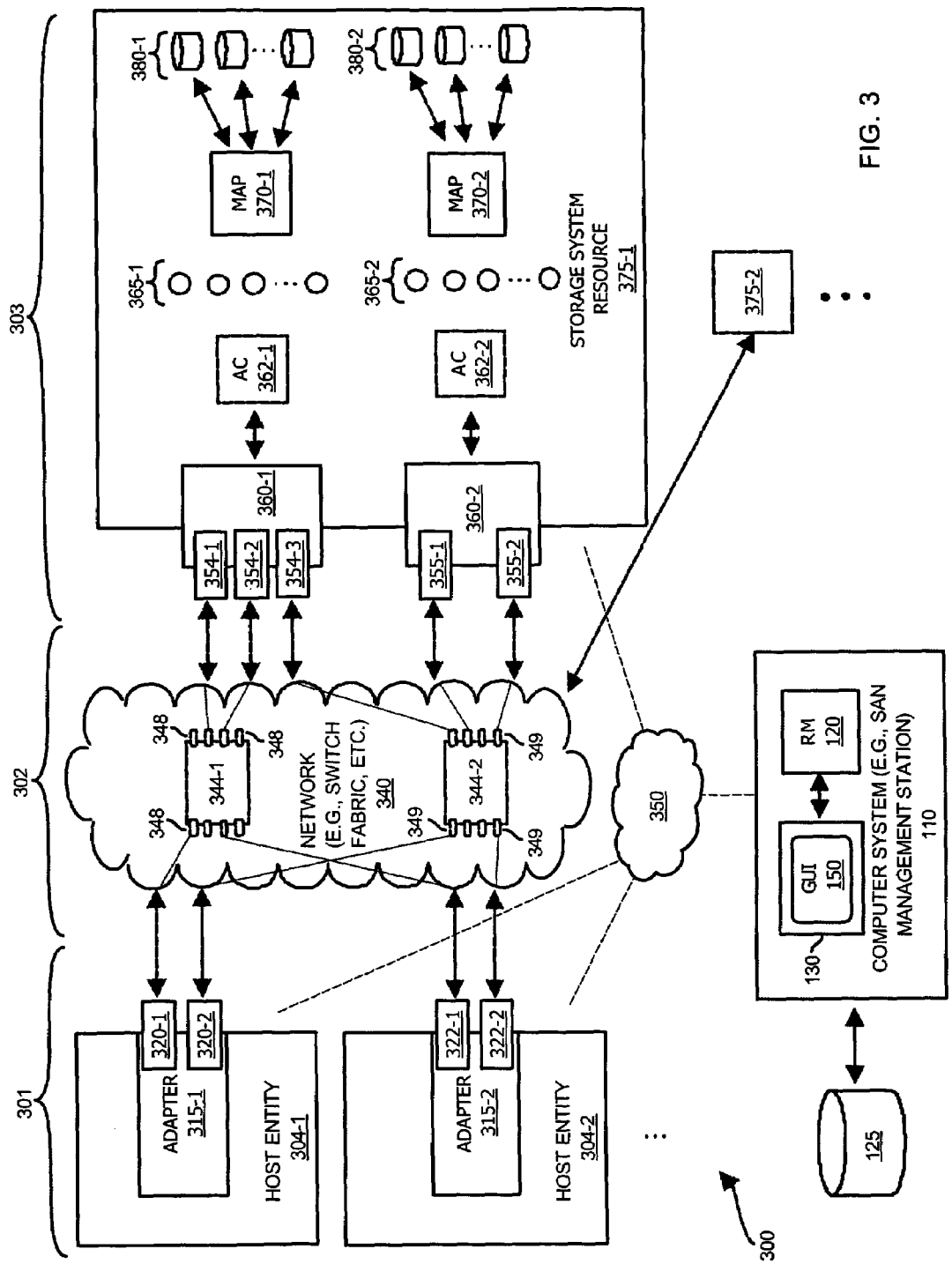
FIG. 3 is a detailed diagram of a storage area network environment for operating a resource manager application according to an embodiment herein.

FIG. 3 is a block diagram more particularly illustrating connectivity of example network resources (e.g., host resources 301, switch resources 302, and storage resources 303) in a storage area network environment 300. As shown, storage area network environment 300 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and repository 125. Network 340 includes switch device 344-1, switch device 344-2, and corresponding switch ports 348 and 349. Host entity 304-1 includes adapter 315-1. Adapter 315-1 has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

At a high level, FIG. 3 illustrates resources of a storage area network that potentially can be viewed and configured by user 108 using graphical user interface 150 generated by resource manager 120. As discussed, graphical user interface 150 facilitates viewing of resources (e.g., an inter-relationship of resources, connectivity of resources, topology of resources, details of resources, etc.) associated with storage area network environment 300 based on different viewing modes, which will be more particularly discussed in the following figures. An example of the different types of possible relationships associated with storage area network resources is also discussed in the co-pending U.S. patent application entitled "METHODS AND APPARATUS FOR GUIDING A USER THROUGH A SAN MANAGEMENT PROCESS," by Hanna Yehuda and Morrie Gasser, Ser. No. 11/021,107, the entire teachings of which are incorporated herein by this reference.

In terms of resources as shown in FIG. 3, network 340 and related resources enable host entities 304 (e.g., servers, host computers, etc.) to access data in storage system resources 375 on behalf of respective clients that communicate through host entities 304. As an example, host entity 304-1 (e.g., a server) couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375.

Based on paths through these resources, host entities 304 access data from physical storage devices 380. For example, host entity 304-1 accesses data from physical storage devices 380 based on a connection path through adapter 315-1, port 320-1, switch 344-1, port 354-1, adapter 360-1 to storage system resource 375-1. Thus, switch devices 344 and corresponding ports 348 and 349 form at least part of a connection path between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300. In general, a zone set defines a group of resources in the network providing a logical path between a host resource and a storage array resource. As will be discussed in more detail, the resource manager 120 enables selection of a management function associated with the storage area network environment 300 and guides the user 108 through corresponding process steps to execute the selected management function and configure resources in storage area network 300. This is discussed in more detail in the following text and related figures.

The disclosure above mentions an example storage area network 300 for discussing an embodiment of the invention. Note that the principles disclosed herein apply to other types of graphical user interface applications as well.

Figure 4:
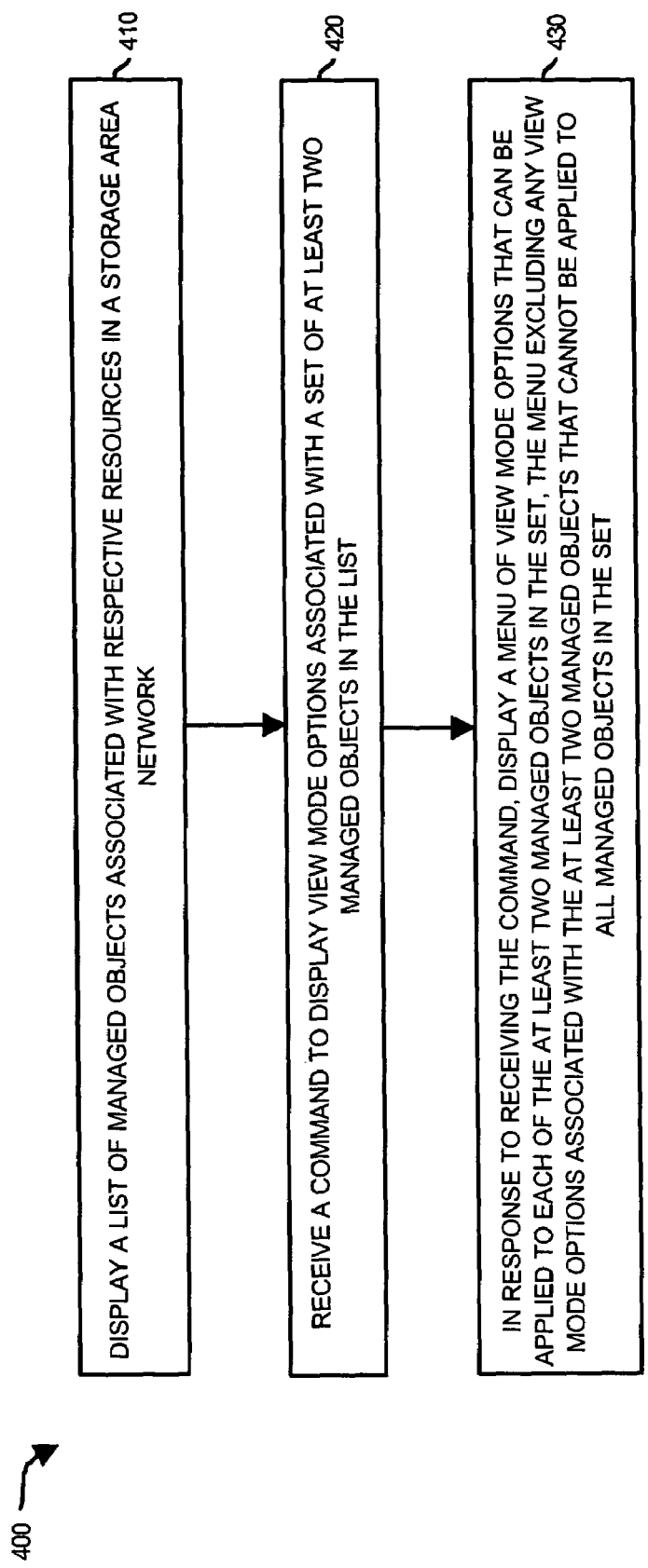
FIG. 4 is a flowchart illustrating a technique of displaying view mode options according to an embodiment herein.
Figure 5:
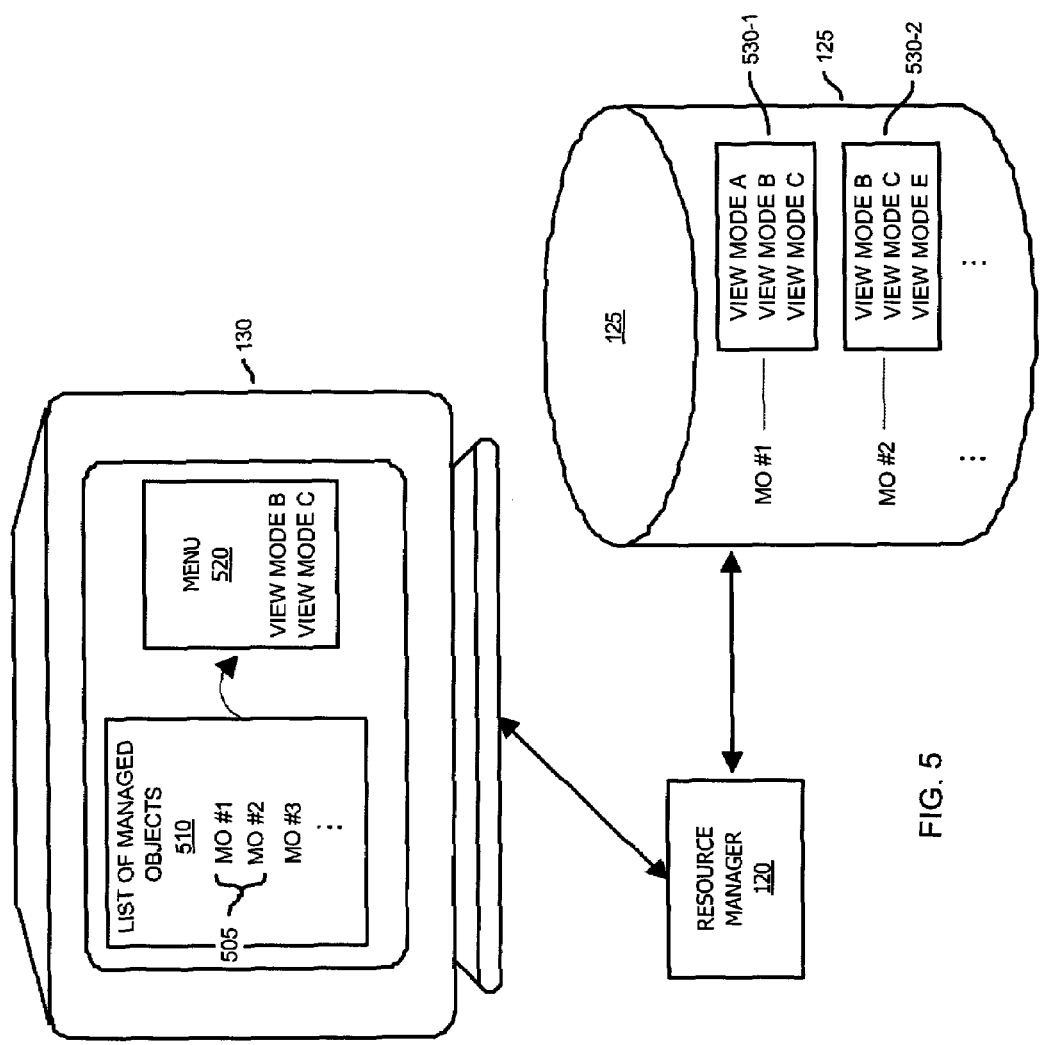
FIG. 5 is a block diagram of a menu including a subset of view mode options applicable to multiple selected managed objects according to an embodiment herein.

FIG. 4 is a diagram of a flowchart 400 illustrating a technique of displaying view mode options according to an embodiment herein. FIG. 4 will be described with respect to the simplified version of an embodiment as shown in FIG. 5. Note that the following discussion includes concepts and techniques discussed above.

In step 410, resource manager 120 displays a list 510 of managed objects associated with respective resources in a storage area network 300.

In step 420, via input to display screen 130 by a user, resource manager 120 receives a command to display view mode options associated with a set 505 of selected managed objects (e.g., MO #1 and MO #2) in the list of managed objects 510.

In step 410, in response to receiving the command, resource manager 120 displays a menu 520 of view mode options that can be applied to each of the at least two managed objects in the set 505. According to the embodiment shown, the menu 520 excludes any view mode options associated with the set 505 of two managed objects that cannot be applied to all managed objects in the set 505. For example, note that repository 125 (or other repository) maintains a respective list of view mode options 530-1 that can be applied to MO #1 and a respective list of view mode options 530-2 that can be applied to MO #2. However, resource manager 120 identifies a list of view mode options common to both selected managed objects in set 505 and displays them in menu 520 for selection by a user. Note that resource manager 120 excludes "view mode A" and "view mode E" from menu 520 because these view mode options are not common to both selected resources in set 505. In other words, "view mode A" applies only to MO #1 and "view mode E" only applies to MO #2. Thus, these respective view modes are not included in menu 520 for selection by a user.

FIGS. 6-14 are screenshots of different management views of graphical user interface 150 (FIG. 1) according to embodiments herein.

Figure 6:
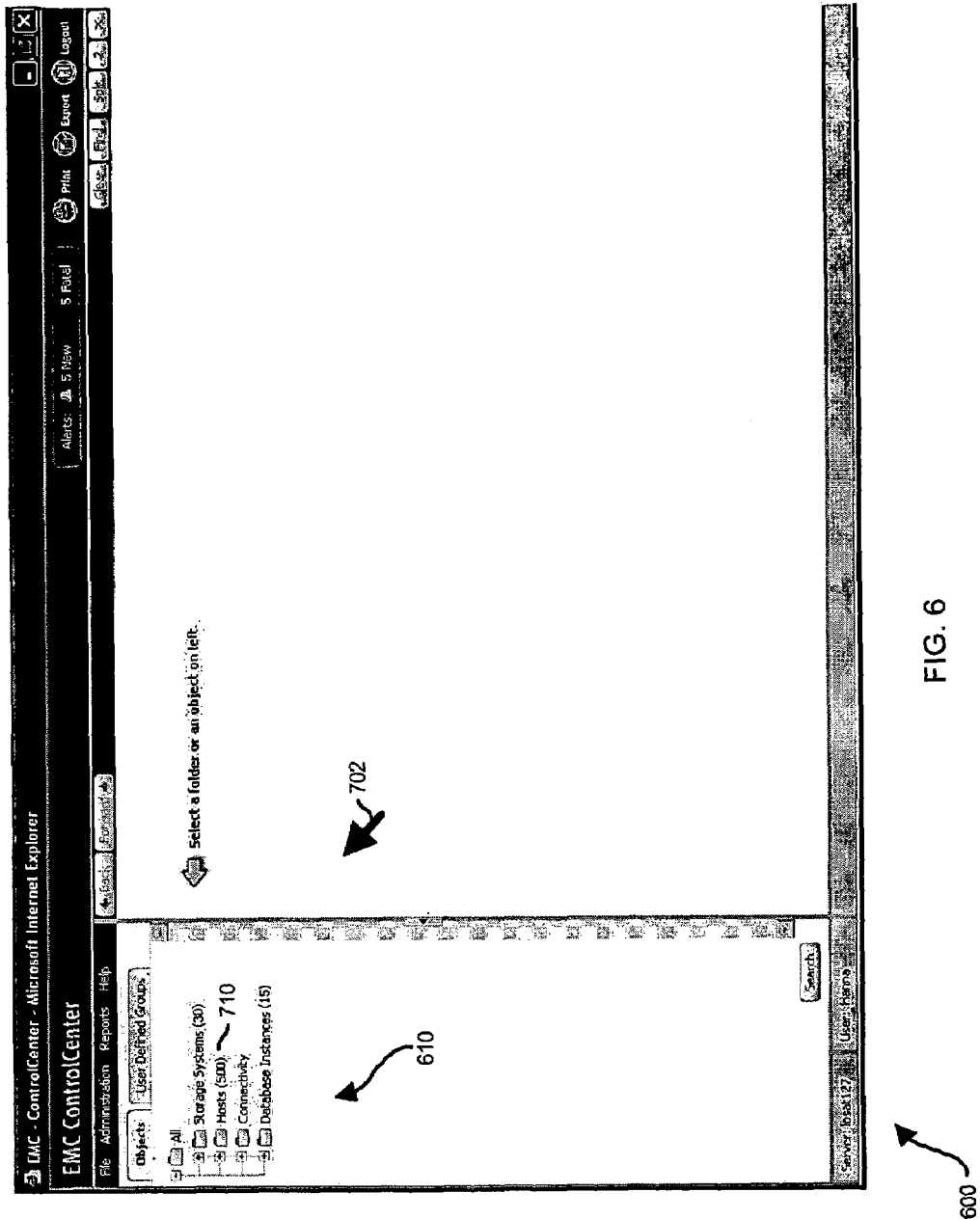
FIG. 6 is a screenshot of a graphical user interface illustrating folders of different types of storage area network resources according to an embodiment herein.

For example, FIG. 6 is a screenshot 600 of graphical user interface 150 enabling a user 108 to select from a hierarchical tree of managed objects 610 or folders of managed objects. In response to selection of folder 710 of managed objects (e.g., a folder of host resources 301 associated with storage area network 300) via use of pointer 702, the resource manager 120 produces screenshot 700 as shown in FIG. 7.

Figure 7:
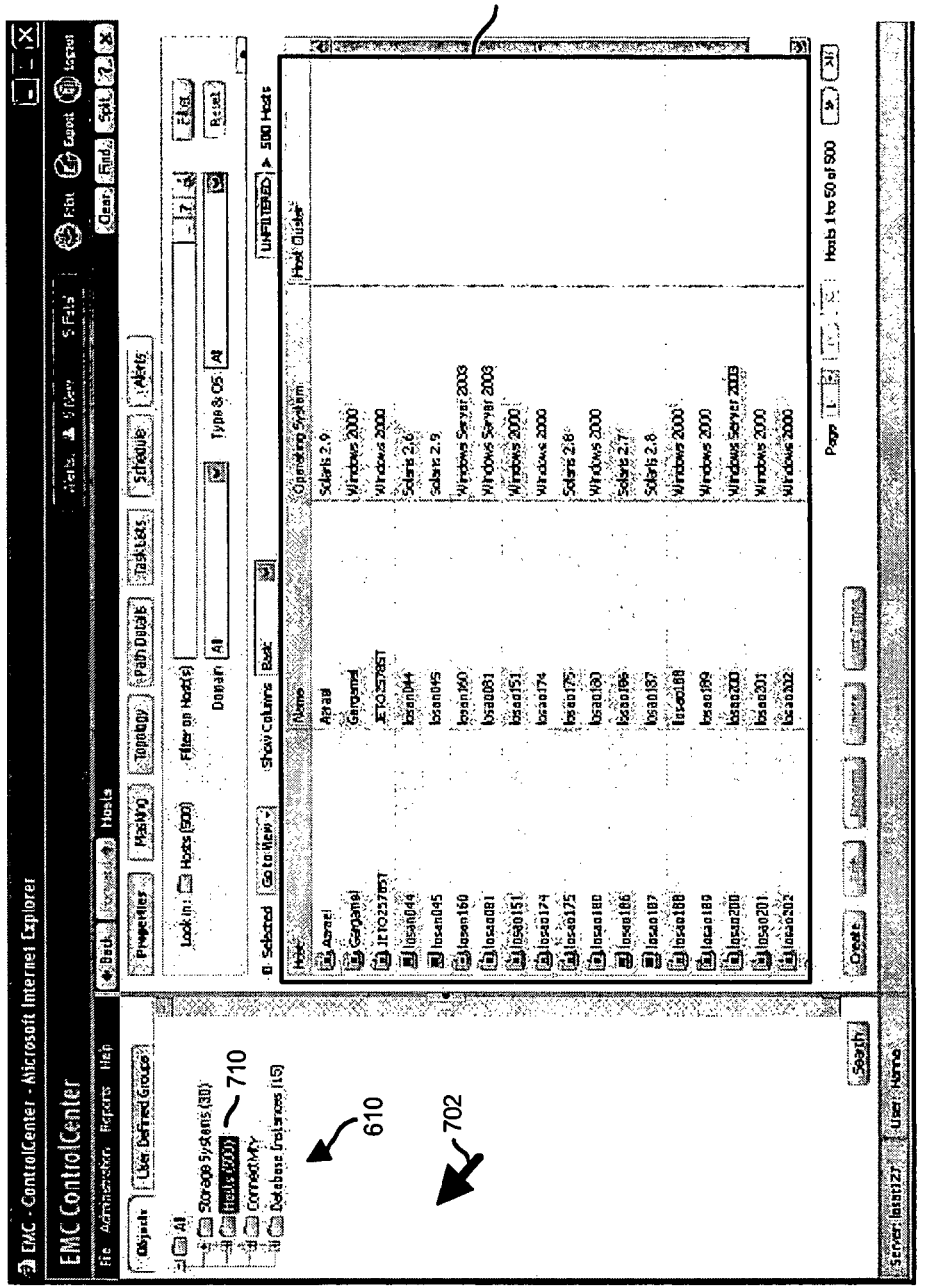
FIG. 7 is a screenshot of a graphical user interface displaying a list of resources (e.g., managed objects) associated with a selected folder according to an embodiment herein.

FIG. 7 is a screenshot 700 including a list of managed objects 510 representing corresponding resources in folder 710 of hierarchical tree of managed objects 610. Resource manager 120 displays the list of managed objects 510 (e.g., contents of folder 710) in response to selection of a group of resources (e.g., folder 710) in the hierarchical tree of managed objects 610.

Each entry (e.g., row of information) in list of managed objects 510 includes a "managed object" symbol and respective name representing a corresponding host resource in storage area network 300. Columns of information in list of managed objects 510 include details associated with a corresponding managed object such as the name of the respective managed object, an operating system associated with the respective managed object, etc.

Figure 8:
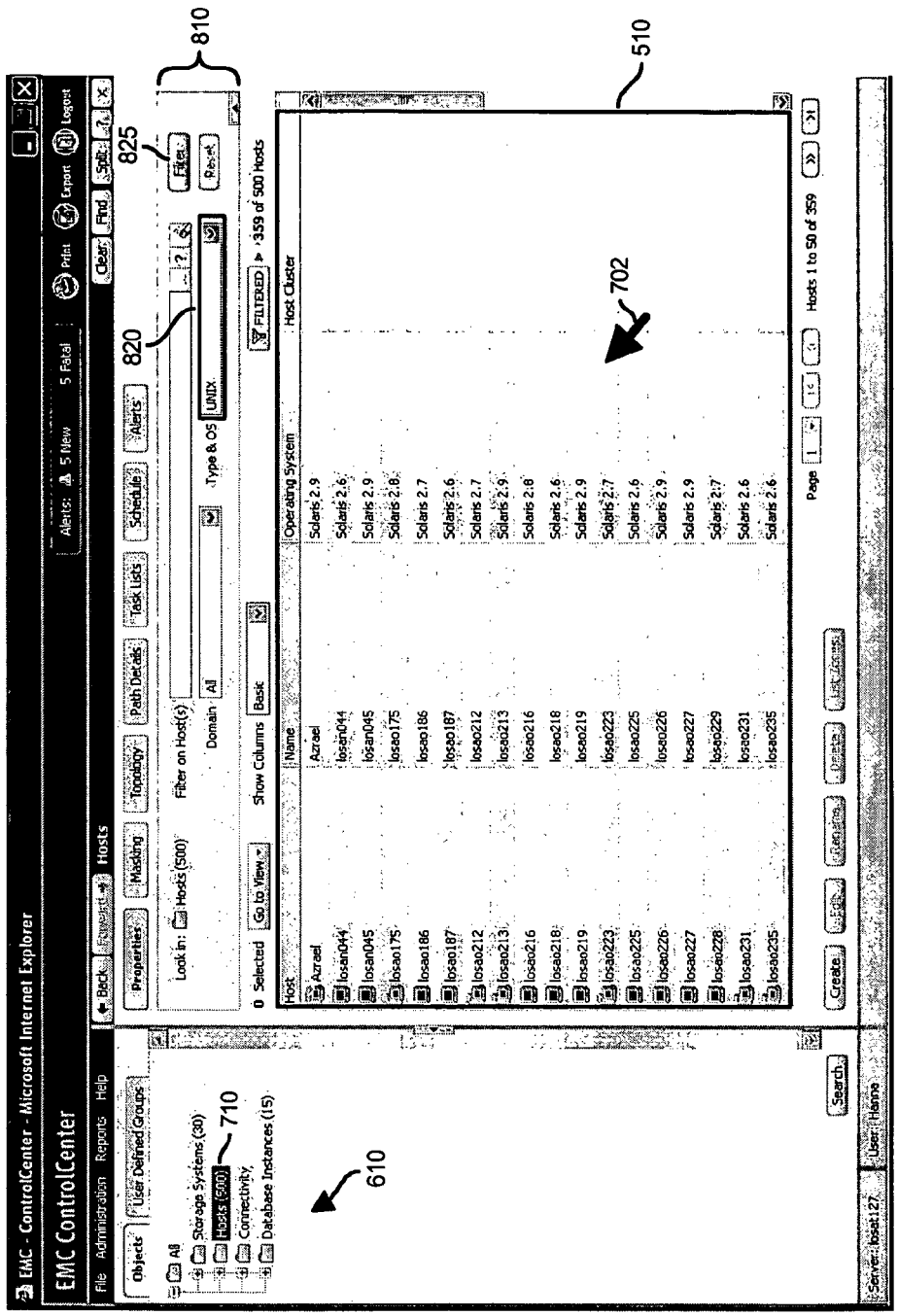
FIG. 8 is a screenshot of a graphical user interface displaying a filtered list of resources (e.g., managed objects) according to an embodiment herein.

FIG. 8 is a screenshot 800 illustrating how list of managed objects 510 can be filtered according to an embodiment herein. For example, a user 108 can utilize filter function 810 to reduce the number of managed objects appearing in list of managed objects 510. In the example shown, the user 108 selects "UNIX" operating system in data field 820. Thereafter, the user 108 uses pointer 702 to select (e.g., click on) filter button 825 to initiate a respective filtering function with respect to list of managed objects 510. The listing of managed objects 510 (after applying the filter function 810) now includes hosts in folder 710 that support the UNIX operating system. Thus, the filter function 820 enables a respective user to reduce a number of managed objects currently being displayed in the list of managed objects 510.

Figure 9:
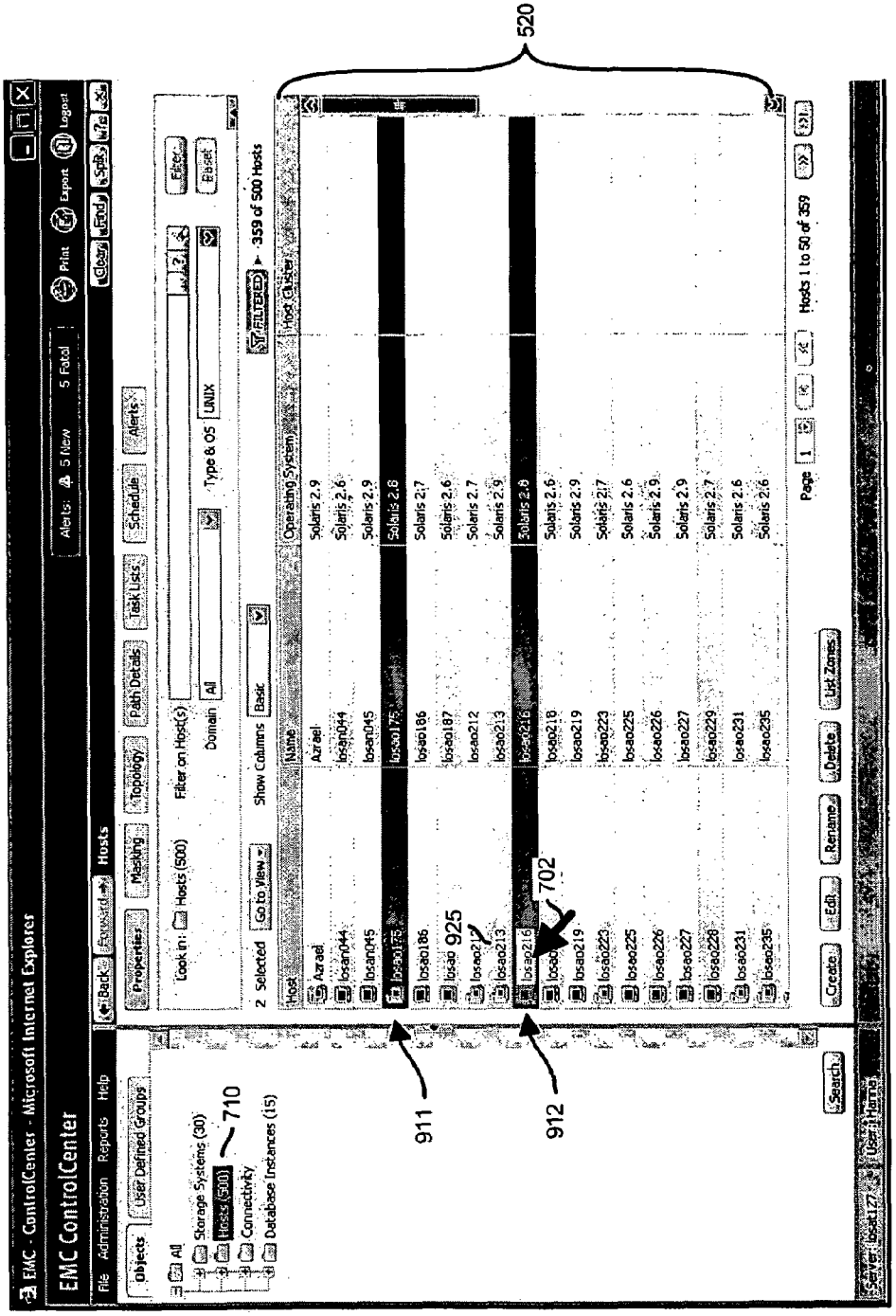
FIG. 9 is a screenshot of a graphical user interface displaying a selection of multiple resources according to an embodiment herein.

FIG. 9 is a screenshot 900 illustrating selection of multiple managed objects (e.g., managed object 911 and managed object 912) in list of managed objects 510 according to an embodiment herein. Note that each of the selected managed objects 911 and 912 can support different view modes as previously discussed with respect to FIG. 5 above. According to one embodiment, user moves pointer 702 over a respective row in list of managed objects 510 to select one or more managed objects. For example, the user moves pointer 702 (e.g., an arrow on display screen 130 that moves based on input from a mouse device) and clicks on the row (or respective icon representing the managed object) corresponding to mop 911 while pressing the "control" button on a keyboard associated with computer system 110. This highlights the respective row associated with managed object 911. Thereafter, the user 108 the user moves pointer 702 over managed object 912 and clicks on the row (or respective icon representing the managed object) while pressing the "control" button on a keyboard associated with computer system 110. This highlights the respective row associated with managed object 912. Thus, the user 108 selects and highlights both managed objects 911 and 912.

Figure 10:
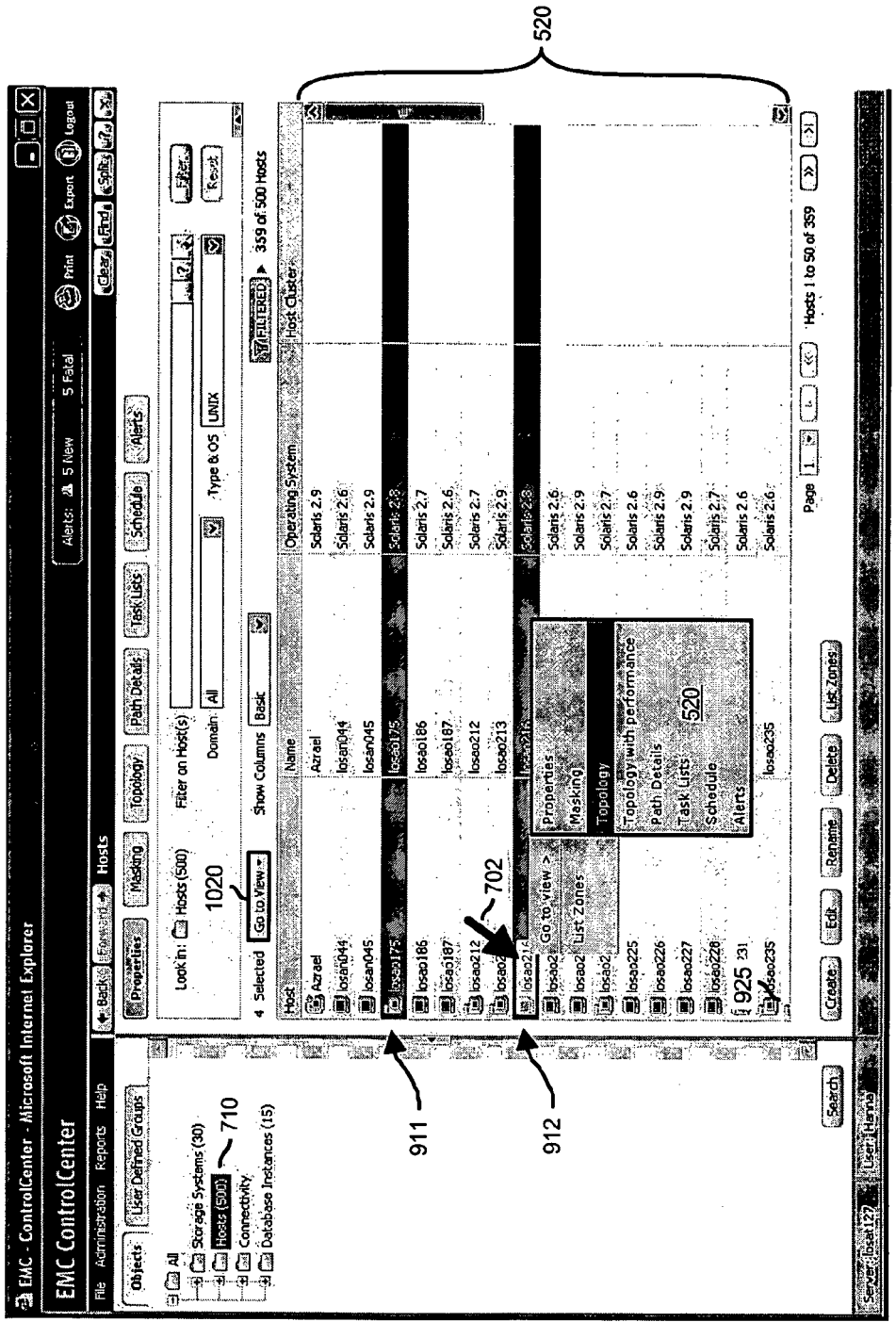
FIG. 10 is a screenshot of a graphical user interface displaying a pull-down menu of selectable view mode options according to an embodiment herein.

FIG. 10 is a screenshot 1000 illustrating a technique for selecting a view mode option according to an embodiment herein. For example, in response to user 108 moving pointer 702 over a highlighted region (e.g., a row of list of managed objects 510) associated with host LOSAO216 and right clicking a respective mouse, the resource manager 120 initiates display of a "go to view" menu 520 for viewing by a user 108. As shown in this example, the user 108 selects one of the view mode options in the menu 520 for viewing the selected managed objects 911 and 912 for viewing in the "Topology" view mode. As discussed earlier with respect to FIG. 5, the menu 520 includes a set of common view mode options that pertain to both LOSAO175 as well as LOSAO216. Note that "go to view" button 1020 provides user 108 an alternative way of clicking and initiating a display of possible view mode options associated with the selected managed objects 911 and 912 in list of managed objects 510.

Figure 11:
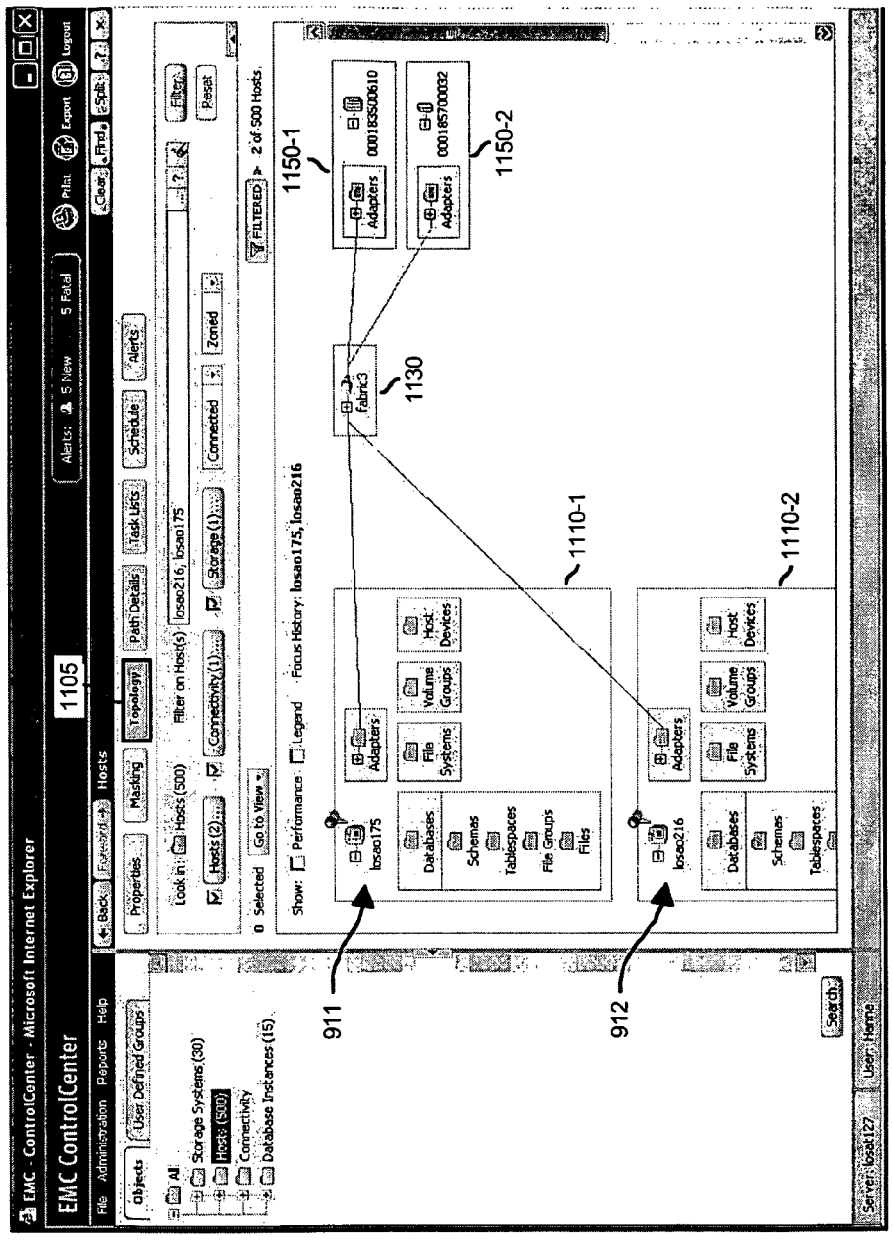
FIG. 11 is a screenshot of a graphical user interface displaying a set of resources based on a selected view mode according to an embodiment herein.

Also, according to a specific embodiment, the user 108 must place pointer 702 over a highlighted region (e.g., the non-shaded region) encompassing a respective icon (e.g., LOSAO216) representing the selected managed object 912 in order to display the screenshot 1100 in FIG. 11. If a user clicks outside the highlighted region but within a highlighted row in the list of managed objects 510, resource manager 120 generates a general viewing of all managed objects in the list of managed objects 510, rather than a view with respect to only the selected managed objects 911 and 912.

Thus, according to one embodiment, resource manager 120 detects a position of a user-controlled pointer in a vicinity of the corresponding symbol associated with selected managed object 912 and, while the user-controlled pointer is positioned in the vicinity of the corresponding symbol, detects that the user right clicks a corresponding mouse associated with the pointer 702 to initiate display of menu 520 (e.g., pull-down menu).

Accordingly, in the example shown, resource manager 120 receives a selection of the "topology" view mode in menu 520. This selection by user 108 indicates to display the set of selected managed objects 911 and 912 to the topology view mode. In response to the menu selection, the resource manager 120 then displays the selected managed objects 911 and 912 on a corresponding display screen 130 according to the selected "topology" view mode. The topology view mode as more particularly shown in FIG. 11 represents a physical topology view of how the selected managed objects 911 and 912 are related to other managed object resources in the storage area network 300.

FIG. 11 is a screenshot 1100 illustrating a topology view associated with the selected managed objects 911 and 912 according to an embodiment herein. As shown, display region 1110-1 includes selectable resources associated with selected managed object 911. Display region 1110-2 includes selectable resources associated with selected managed object 912. As indicated by respective relationship lines, both host LOSAO175 and host LOSAO216 are connected to storage resources 1150-1 and 1150-2 of storage area network 300 through fabric 1130.

Figure 12:
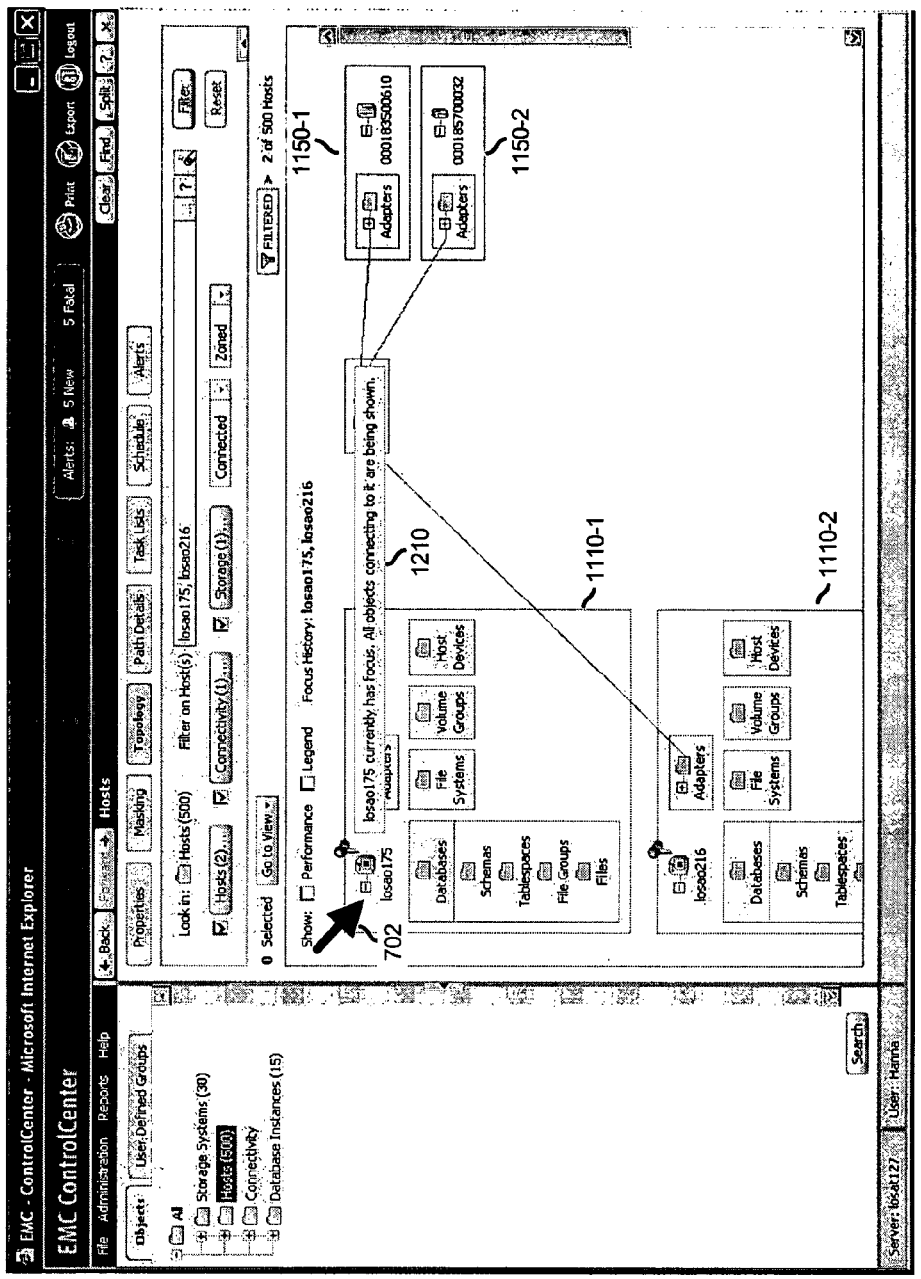
FIG. 12 is a screenshot of a graphical user interface displaying a set of resources based on a selected view mode according to an embodiment herein.

FIG. 12 is a screenshot 1200 illustrating pop-up text 1210 that appears on display screen 130 when a user 108 moves pointer 702 over icon LOSAO175. In general, resource manager 120 displays pop-up text 1210 to describe what the user is pointing to on the display screen 130.

Figure 13:
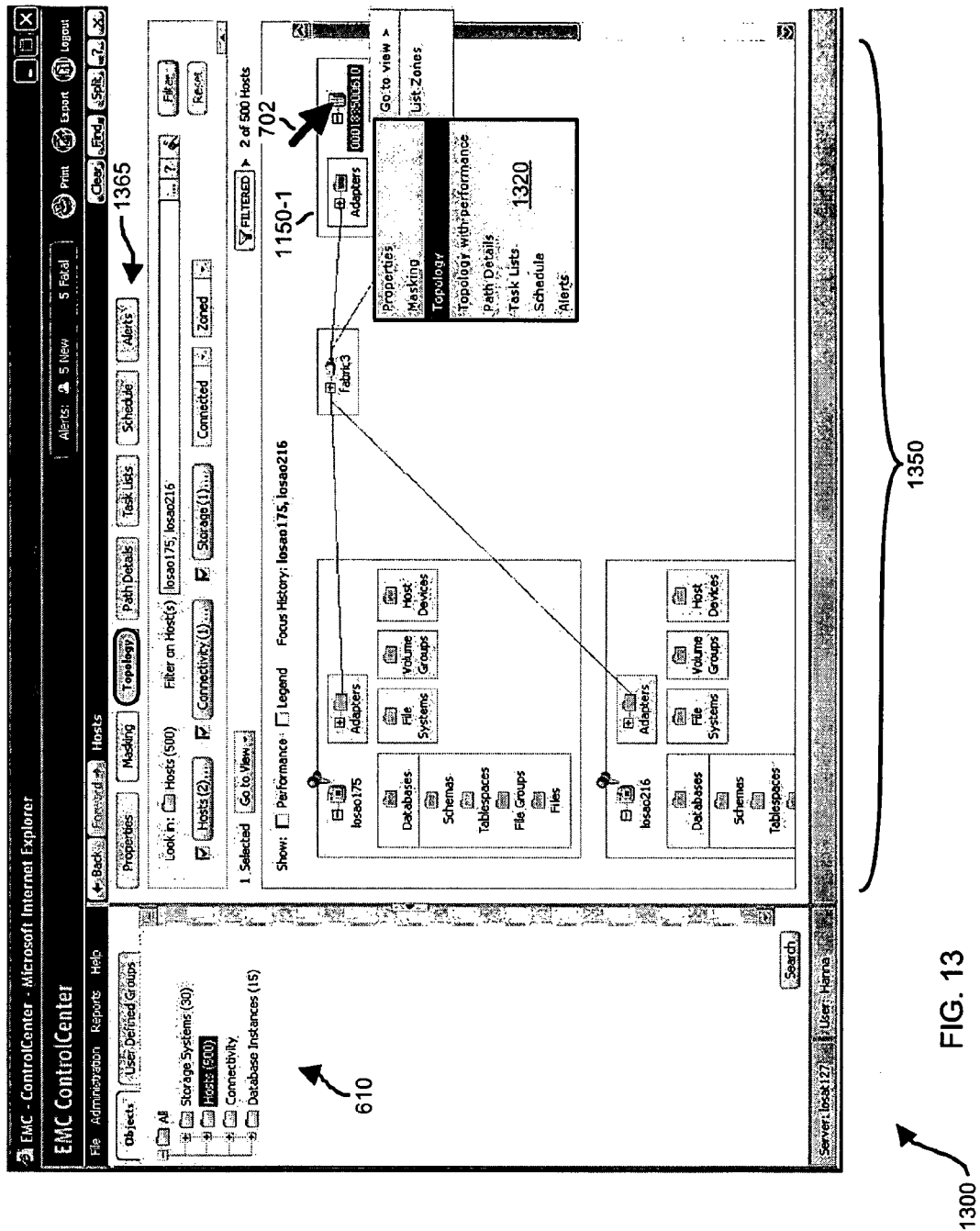
FIG. 13 is a screenshot of a graphical user interface displaying a pull-down menu of view mode options that can be applied to a respective storage resource according to an embodiment herein.
Figure 14:
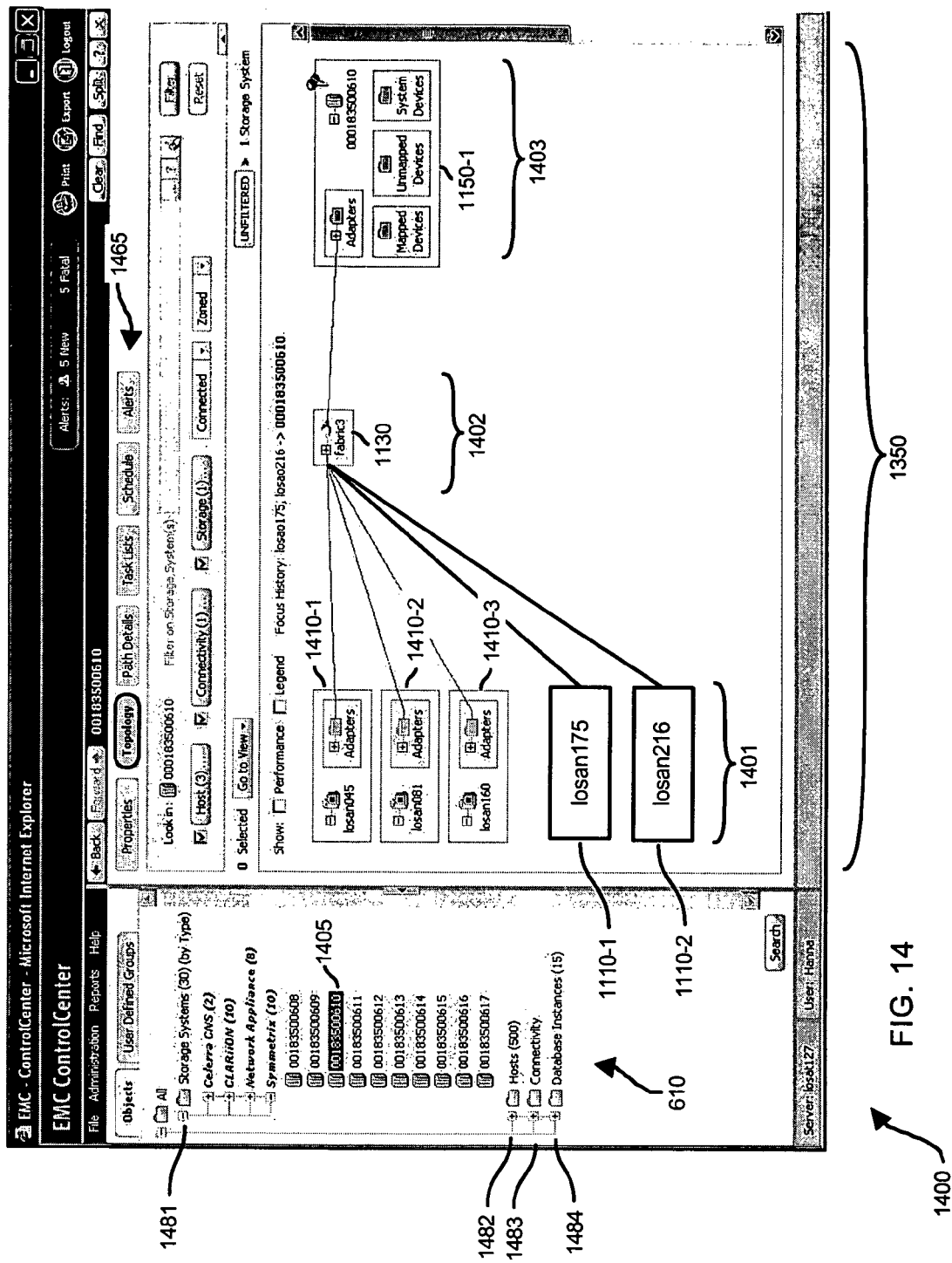
FIG. 14 is a screenshot of a graphical user interface displaying resources associated with a storage area network according to an embodiment herein.

FIG. 13 is a screenshot 1300 illustrating that the user 108 can initiate display of menu 1320 for modifying a current view according to an embodiment herein. For example, as shown, user 108 moves pointer 702 in relation (e.g., close proximity) to storage resource icon labeled "000183500610." The user 108 then right clicks a respective mouse to initiate display of "go to view" menu 1320. In response to selecting "topology" view in menu 1320, resource manager 120 produces screenshot 1400 as shown in FIG. 14. Note that buttons 1365 indicate different possible view mode options associated with the highlighted item in the hierarchical tree 610. In this case, the "topology" button is highlighted to indicate a current view mode of selected host resources.

FIG. 14 is a screenshot 1400 illustrating managed objects (e.g., managed object 1410-1, managed object 1410-2, managed object 1410-3, managed object 1110-1, and managed object 1110-2) that have access through managed object 1130 (e.g., fabric3) to managed object 1150-1 (e.g., storage resource 000183500610). Thus, as shown, the user 108 expanded a view mode on display screen 130 to view additional host resources mapped to storage resource 000183500610 rather than view a relationship of managed objects 1110-1 and 1110-2 to other managed objects associated with storage area network 300. Note that upon selection of the specific managed object 000183500610, resource manager 120 updates hierarchical tree of managed objects 610 to indicate that resource 1405 is now the focus of the topology view as shown in screenshot 1400.

Based on the above techniques, a user can select a folder in a hierarchical tree 610 and thereafter view different configurations and corresponding resources of a respective storage area network without having to go back and make further selections from the hierarchical tree. For example, recall that as shown in FIG. 13 and previous figures, the user 108 initially selected a resource from the folder labeled "Hosts (500)" in hierarchical tree 610. Thus, the resource manager 120 at least initially highlights this folder to indicate from which location (e.g., specific resource or resources such as a folder) in hierarchical tree 610 an original selection has been made for viewing respective resources in display region 1350. Recall also that the user 108 thereafter selected specific resources "losao175" and "losao216" (e.g., a host resource) for viewing in display region 1350. Based on these specific selections, resource manager 120 displays these selected resources as well as other related resources (e.g., resource named "fabric3", resource named "000183500610" in addition to resource "losao175" and "losao216") depending on a selected view mode. In this case, the user 108 selected the topology view mode for viewing the host resources "losao175" and "losao216."

As further shown in FIG. 13, a user 108 selects a related resource (e.g., storage system resource 000183500610) for viewing respective configuration information. Thus, even though a user 108 initially selected two host resources (e.g., "losao175" and "losao216") in hierarchical tree 610 for viewing in display region 1350, the user 108 can select "related" resources in display region 1350 to view yet other relationships of resources without having to go back and make a selection from hierarchical tree 610. Selection of a new resource for viewing can be made from a dialog box or resource view in display region 1350. For example, a user 108 can select storage system resource "000183500610" for viewing all resources related to storage system resource "000183500610" rather than just view a relationship of the initially selected host resources "losao175" and "losao216" with respect to storage system resource "000183500610."

After selection of storage resource "000183500610" as illustrated in FIG. 13 via arrow 702, resulting FIG. 14 illustrates how resource manager 120 expands a display of resources related to the selected storage system resource "000183500610" by indicating that (in addition to host resources "losao175" and "losao216") host resource "losan045", host resource "losan081", and host resource "losan160" also have access to storage system resource "000183500610" through connectivity resource "fabric3." Thus, based on techniques herein, the user 108 can navigate through different configuration views without having to be burdened with clicking on entries in the hierarchical tree 610 to adjust a respective viewing of resources in display region 1350. Instead, the user 108 clicks on a visual representation of a displayed resource in order to learn about configuration information associated with the respective storage area network.

As further shown in FIG. 14, and as previously discussed, the selection of storage resource "000183500610" prompts resource manager 120 to update hierarchical tree 610 to include highlighting with respect to storage system resource "000183500610" in the hierarchical tree 610 in order to indicate that storage system resource "000183500610" is now a focus of the configuration information shown in display region 1350. For example, the "hosts" folder was previously highlighted. After selection of a new resource, the resource manager 120 expands a listing of appropriate folders and sub-folders in the hierarchical tree 610 in order to properly highlight the newly selected storage system resource "000183500610" and its respective location in the hierarchical tree 610.

Note that resource manager 120 expands different portions of hierarchical tree 610 depending on which portion of display region 1350 the user makes a selection. For example, the hierarchical tree 610 includes a storage system resource folder 1481, a host resource folder 1482, a connectivity resource folder 1483, and a database instance folder 1484. Resources in display region 1401 correspond to respective resource stored in host resource folder 1482. Resources in display region 1402 correspond to respective resources stored in connectivity resource folder 1483. Resources in display region 1403 correspond to respective resources stored in storage system resource folder 1481.

Figure 15:
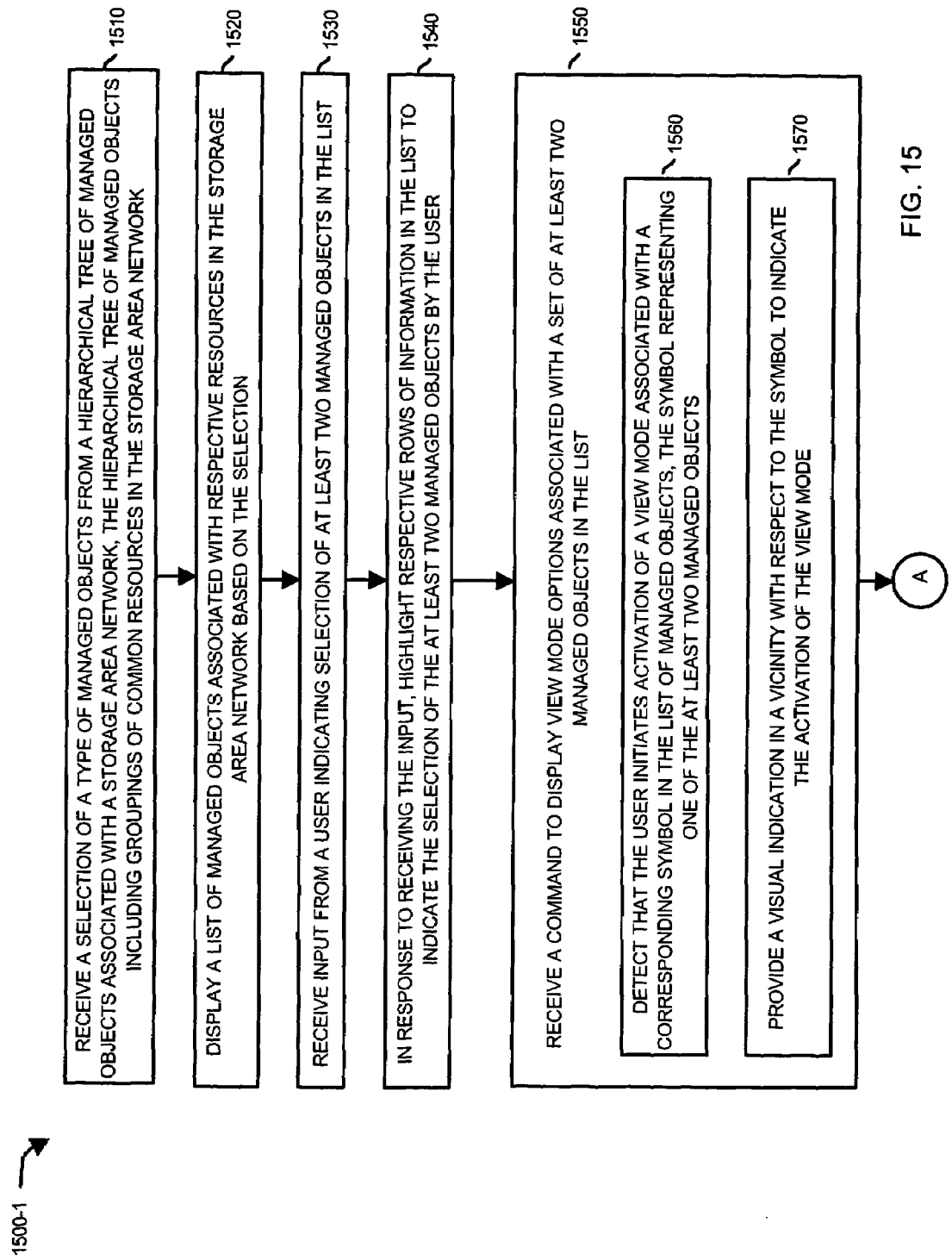
FIGS. 15-16 are flowcharts illustrating a technique of facilitating management of resources associated with a respective storage area network according to an embodiment herein.
Figure 16:
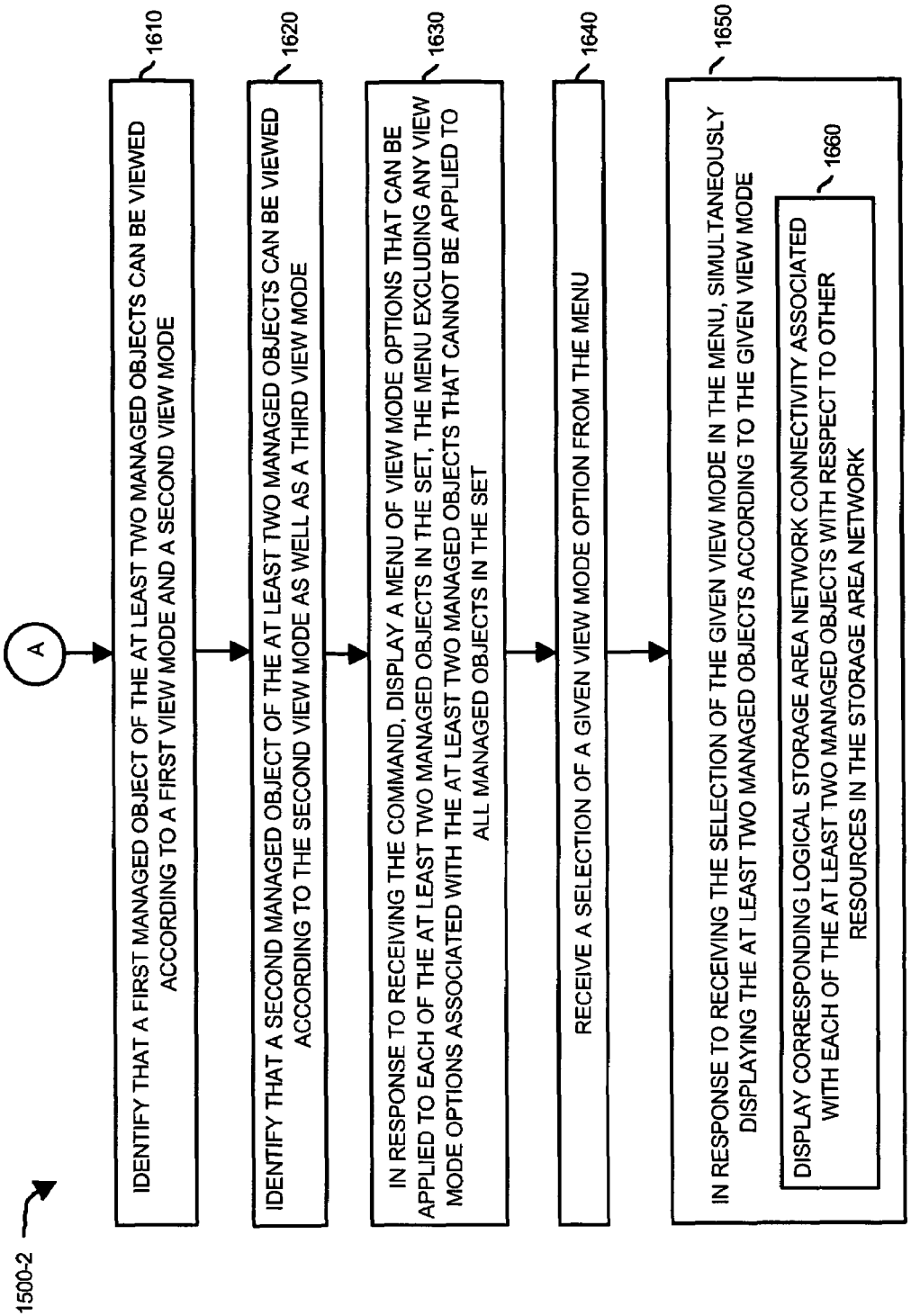

Upon selection of a respective resource in one of these three regions (e.g., display region 1401, display region 1402, or display region 1403) of display region 1350, the resource manager 120 expands hierarchical tree 610 depending on which folder a resource is selected. Accordingly, one embodiment herein includes expanding the hierarchical tree 610 for viewing a respective sub-level (e.g., folder, sub-folder, resource, etc.) of the hierarchical tree 610 including the respective resource associated with a new selection. FIGS. 15 and 16 combine to form flowchart 1500 (e.g., flowchart 1500-1 and flowchart 1500-2) illustrating processing steps performed by resource manager 120.

In addition to highlighting a new selection in the hierarchical tree 610 as discussed, note that buttons 1465 in display region 1350 of FIG. 14 do not include the "masking" button as previously shown in FIG. 13. This is because the resource manager 120 generating screenshot 1400 updates buttons 1465 to reflect current view mode options for viewing the highlighted resource in the hierarchical tree 610. The "masking" view mode option does not apply to storage system resource 000183500610 (e.g., a Symmetrix™ storage system) and therefore is not included at the top of display region 1350 as a selectable view mode option. Thus, the currently displayed buttons 1465 pertain to view mode options associated with a currently highlighted resource in the hierarchical tree 610.

In step 1510 of FIG. 15, resource manager 120 receives a selection of a type of managed objects (e.g., a selection of a folder 710 of resources) from a hierarchical tree of managed objects 610 associated with a storage area network 300. The hierarchical tree of managed objects 610 includes groupings of common resources (e.g., folders, sub-folders, etc.) in the storage area network 300.

In step 1520, resource manager 120 displays a list of managed objects 510 associated with respective resources in the storage area network 300 based on the selection.

In step 1530, resource manager 120 receives input from a user 108 indicating selection of at least two managed objects from the list of managed objects 510.

In step 1540, in response to receiving the input, resource manager 120 highlights respective rows of information in the list of managed objects 510 to indicate the selection of the at least two managed objects by the user 108.

In step 1550, resource manager 120 receives a command to display view mode options (e.g., in menu 520) associated with a set of two or more selected managed objects in the list of managed objects 510.

In sub-step 1560, resource manager 120 detects that the user 108 initiates activation of a view mode associated with a corresponding symbol (e.g., managed object icon) in the list of managed objects. The symbol represents a selected managed object.

In sub-step 1570, resource manager 120 provides a visual indication in a vicinity with respect to the symbol to indicate activation or selection of the respective managed object. An example of this technique is shown in FIG. 10 as a non-shaded region around LOSAO216 symbol associated with managed object 912.

In step 1610 of flowchart 1500-2 of FIG. 16, resource manager 120 identifies that a first managed object of a set of selected managed objects can be viewed according to a first view mode and a second view mode.

In step 1620, resource manager 120 identifies that a second selected managed object of the set of selected managed objects can be viewed according to the second view mode as well as a third view mode.

In step 1630, in response to receiving the command, resource manager 120 displays a menu 520 of view mode options that can be applied to each of the selected managed objects in the set. The menu 520 excludes any view mode options associated with the at least two managed objects that cannot be applied to all managed objects in the set.

In step 1640, resource manager 120 receives a selection of a given view mode option from menu 520.

In step 1650, in response to receiving the selection of the given view mode in the menu 520, resource manager 120 simultaneously displays the selected set of managed objects according to the given view mode.

In sub-step 1660, resource manager 120 displays corresponding logical storage area network connectivity associated with each of the selected managed objects with respect to other resources in the storage area network.

Figure 17:
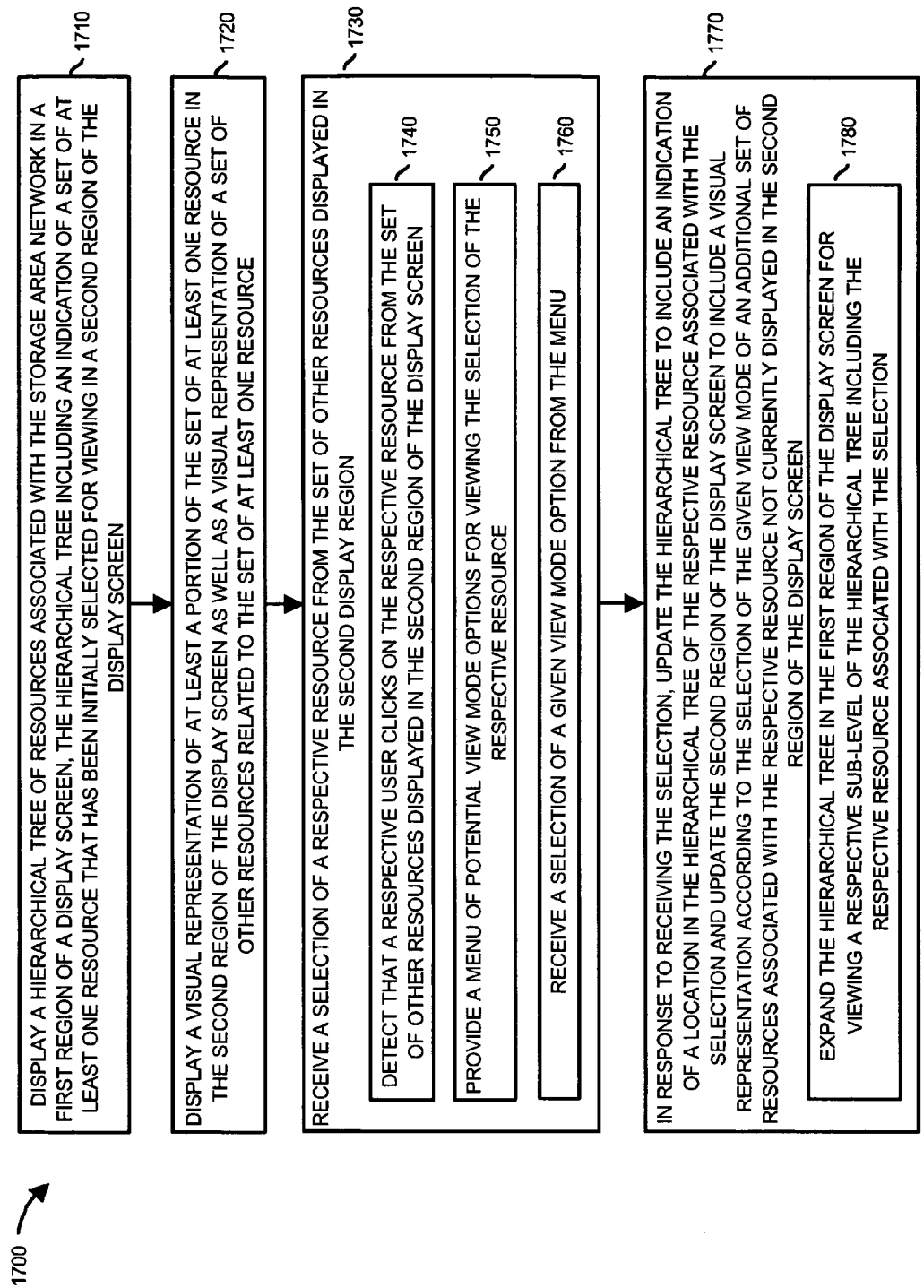
FIG. 17 is a diagram of a flowchart illustrating a technique of enabling navigation amongst resources in a storage area network according to an embodiment herein.

FIG. 17 is a diagram of a flowchart 1700 illustrating a technique of enabling a user 108 to view configuration information associated with a storage area network without having to make repeated selections from hierarchical tree 610. Note that the following discussion includes concepts and techniques discussed above.

In step 1710, resource manager 120 displays a hierarchical tree 610 of resources associated with the storage area network in a first region of a display screen 130. The hierarchical tree 610 includes an indication of a set of at least one resource that has been initially selected for viewing in a second region of the display screen 130.

In step 1720, resource manager 120 displays a visual representation of at least a portion of the set of at least one resource in the second region of the display screen 130 as well as a visual representation of a set of other resources related to the set of at least one resource.

In step 1730, resource manager 120 receives a selection of a respective resource from the set of other resources displayed in the second display region.

In sub-step 1740, resource manager 120 detect that a respective user clicks on the respective resource from the set of other resources displayed in the second region of the display screen 130.

In sub-step 1750, resource manager 120 provides a list or menu of potential view mode options for viewing the selection of the respective resource.

In sub-step 1760, resource manager 120 receives a selection of a given view mode option from the menu.

In step 1770, in response to receiving the selection, the resource manager 120 updates the hierarchical tree to include an indication of a location in the hierarchical tree of the respective resource associated with the selection and updates the second region of the display screen to include a visual representation according to the selection of the given view mode of an additional set of resources associated with the respective resource not currently displayed in the second region of the display screen.

In step 1780, resource manager 120 expands the hierarchical tree 610 in the first region of the display screen for viewing a respective sub-level of the hierarchical tree 610 including the respective resource associated with the selection.

As discussed, techniques herein are well suited for use in applications such as management of storage area networks. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method in which at least one computer system initiates execution of instructions retrieved from storage to facilitate management of a storage area network, the computer-implemented method comprising:

displaying a list of managed objects associated with respective resources in the storage area network;

receiving a command to display view mode options associated with a set of at least two managed objects in the list; and in response to receiving the command, displaying a menu of view mode options that can be applied to each of the at least two managed objects in the set, the menu excluding any view mode options associated with the at least two managed objects that cannot be applied to all managed objects in the set;

receiving a selection of a given view mode option from the menu;

in response to receiving the selection of the given view mode in the menu, simultaneously displaying the at least two managed objects according to the given view mode;

wherein simultaneously displaying the at least two managed objects according to the given view mode includes displaying a first view of corresponding logical storage area network connectivity, the first view based on a viewing of the at least two managed objects with respect to a set of other resources in the storage area network related to the set of at least two managed objects, the computer-implemented method further comprising:

initiating display of focus history information in the first view of the corresponding logical storage area network connectivity, the focus history information indicating that the first view of the corresponding logical storage area network connectivity is based on the at least two managed objects;

receiving a selection of a particular resource from the set of other resources displayed in the first view of corresponding logical storage area network connectivity;

in response to receiving the selection of the particular resource, expanding the first view of the corresponding logical storage area network connectivity into a second view, the second view including display of the set of at least two managed objects and an additional set of resources associated with the particular resource; and in addition to expanding the first view to the second view, updating display of the focus history information to indicate that the second view of the corresponding logical storage area network connectivity is based on the particular resource.

2. A computer-implemented method as in claim 1, wherein displaying the list of managed objects occurs in response to selection of a type of managed objects from a hierarchical tree of managed objects associated with the storage area network, the hierarchical tree of managed objects including groupings of common resources in the storage area network.

3. A computer-implemented method as in claim 2, wherein displaying the list of managed objects associated with respective resources in the storage area network includes initiating display of the list of managed objects in a first region of a display screen, the method further comprising:
- initiating display of the hierarchical tree of managed objects in a second region of a display screen; and
- initiating display of a filter function associated with the list of managed objects in a third region of the display screen, the filter function enabling a user to reduce a number of managed objects currently being displayed in the list.

4. A computer-implemented method as in claim 3, wherein displaying the list of managed objects occurs in response to selection of a grouping of resources in the hierarchical tree of managed objects.

5. A computer-implemented method as in claim 1 further comprising:
- receiving input from a user indicating selection of the at least two managed objects in the list; and
- in response to receiving the input, highlighting respective rows of information in the list to indicate the selection of the at least two managed objects by the user.

6. A computer-implemented method as in claim 5, wherein receiving the command to display the menu of view mode options includes:
- detecting that the user initiates activation of a view mode associated with a corresponding symbol in the list of managed objects, the symbol representing one of the at least two managed objects; and
- providing a visual indication in a vicinity with respect to the corresponding symbol to indicate the activation of the view mode.

7. A computer-implemented method as in claim 6, wherein receiving the command to display the menu of view mode options includes:
- detecting a position of a user-controlled pointer in a vicinity of the corresponding symbol; and
- while the user-controlled pointer is positioned in the vicinity of the corresponding symbol, detecting that the user right clicks a corresponding mouse associated with the pointer to initiate display of a pull-down menu.

8. A computer-implemented method as in claim 1 further comprising:
- identifying that a first managed object of the at least two managed objects can be viewed according to a first view mode and a second view mode;
- identifying that a second managed object of the at least two managed objects can be viewed according to the second view mode as well as a third view mode; and
- wherein displaying the menu of view mode options that can be applied to each of the at least two managed objects includes displaying an indication of the second view mode as a selectable option for viewing the at least two managed objects, while excluding respective indications of the first view mode and the third view mode from the menu of the view mode options.

9. A computer-implemented method as in claim 8 further comprising:
- receiving a selection of the second view mode in the menu by a user to display the at least two managed objects according to the second view mode;
- displaying the at least two managed objects on a corresponding display screen according to the second view mode, the second view mode including a physical topology view of how the at least two managed objects are related to other managed object resources in the storage area network; and
- while displaying the at least two managed objects as well as the other managed object resources, enabling the user to select at least one of the other managed object resources and view a respective selected managed object resource according to another view mode.

10. A computer-implemented method as in claim 1 further comprising:
- displaying the focus information in the second view to include a sequence of multiple entries, each entry in the sequence corresponding to a respective view of the corresponding logical storage area network connectivity.

11. A computer-implemented method as in claim 10 further comprising:
- providing an indication of a progression of displaying different views of the corresponding logical storage area network connectivity by displaying the focus information in the second view to include the sequence of multiple entries, the sequence of multiple entries including a first entry and a second entry, the first entry of the sequence indicating identities of the at least two resources and being associated with the first view, the second entry of the sequence indicating an identity of the particular resource.

12. A computer-implemented method as in claim 11 further comprising:
- in the first view, displaying a first set of view modes that can be applied to the set of at least two resources; and
- in the second view, displaying a second set of view modes that can be applied to the particular resource, the first set of view modes being different than the second set of view modes.

13. A computer system comprising:
- a processor;
- a memory unit that stores instructions associated with an application executed by the processor; and
- an interconnect coupling the processor and the memory unit, enabling the computer system to execute the application and perform operations of:
  - displaying a list of managed objects associated with respective resources in a storage area network;
  - receiving a command to display view mode options associated with a set of at least two managed objects in the list; and
  - in response to receiving the command, displaying a menu of view mode options that can be applied to each of the at least two managed objects in the set, the menu excluding any view mode options associated with the at least two managed objects that cannot be applied to all managed objects in the set;
  - receiving a selection of a given view mode option from the menu;
  - in response to receiving the selection of the given view mode in the menu, simultaneously displaying the at least two managed objects according to the given view mode;
  - wherein simultaneously displaying the at least two managed objects according to the given view mode includes displaying a first view of corresponding logical storage area network connectivity, the first view based on a viewing of the at least two managed objects with respect to a set of other resources in the storage area network related to the set of at least two managed objects;

initiating display of focus history information in the first view of the corresponding logical storage area network connectivity, the focus history information indicating that the first view of the corresponding logical storage area network connectivity is based on the at least two managed objects;

receiving a selection of a particular resource from the set of other resources displayed in the first view of corresponding logical storage area network connectivity;

in response to receiving the selection of the particular resource, expanding the first view of the corresponding logical storage area network connectivity into a second view, the second view including display of the set of at least two managed objects and an additional set of resources associated with the particular resource; and in addition to expanding the first view to the second view, updating display of the focus history information to indicate that the second view of the corresponding logical storage area network connectivity is based on the particular resource.

14. A computer program product including a computer-readable medium having instructions stored thereon for processing data information, such that the instructions, when carried out by a processing device, enable the processing device to perform operations of:

displaying a list of managed objects associated with respective resources in a storage area network;

receiving a command to display view mode options associated with a set of at least two managed objects in the list; and in response to receiving the command, displaying a menu of view mode options that can be applied to each of the at least two managed objects in the set, the menu excluding any view mode options associated with the at least two managed objects that cannot be applied to all managed objects in the set;

receiving a selection of a given view mode option from the menu;

in response to receiving the selection of the given view mode in the menu, simultaneously displaying the at least two managed objects according to the given view mode;

wherein simultaneously displaying the at least two managed objects according to the given view mode includes displaying a first view of corresponding logical storage area network connectivity, the first view based on a viewing of the at least two managed objects with respect to a set of other resources in the storage area network related to the set of at least two managed objects;

initiating display of focus history information in the first view of the corresponding logical storage area network connectivity, the focus history information indicating that the first view of the corresponding logical storage area network connectivity is based on the at least two managed objects;

receiving a selection of a particular resource from the set of other resources displayed in the first view of corresponding logical storage area network connectivity;

in response to receiving the selection of the particular resource, expanding the first view of the corresponding logical storage area network connectivity into a second view, the second view including display of the set of at least two managed objects and an additional set of resources associated with the particular resource; and in addition to expanding the first view to the second view, updating display of the focus history information to indicate that the second view of the corresponding logical storage area network connectivity is based on the particular resource.

15. A computer system comprising a processor configured to execute instructions retrieved from storage, the computer system supporting management of a storage area network, the computer system including:

means for displaying a list of managed objects associated with respective resources in the storage area network;

means for receiving a command to display view mode options associated with a set of at least two managed objects in the list; and means for displaying a menu of view mode options that can be applied to each of the at least two managed objects in the set in response to receiving the command, the menu excluding any view mode options associated with the at least two managed objects that cannot be applied to all managed objects in the set;

means for receiving a selection of a given view mode option from the menu;

means for simultaneously displaying the at least two managed objects according to the given view mode in response to receiving the selection of the given view mode in the menu;

wherein means for simultaneously displaying the at least two managed objects according to the given view mode includes means for displaying a first view of corresponding logical storage area network connectivity, the first view based on a viewing of the at least two managed objects with respect to a set of other resources in the storage area network related to the set of at least two managed objects;

means for initiating display of focus history information in the first view of the corresponding logical storage area network connectivity, the focus history information indicating that the first view of the corresponding logical storage area network connectivity is based on the at least two managed objects;

means for receiving a selection of a particular resource from the set of other resources displayed in the first view of corresponding logical storage area network connectivity;

means for expanding the first view of the corresponding logical storage area network connectivity into a second view in response to receiving the selection of the particular resource, the second view including display of the set of at least two managed objects and an additional set of resources associated with the particular resource; and in addition to means for expanding the first view to the second view, means for updating display of the focus history information to indicate that the second view of the corresponding logical storage area network connectivity is based on the particular resource.

* * * * *